(12) United States Patent
Guo et al.

(10) Patent No.: US 12,401,733 B2
(45) Date of Patent: Aug. 26, 2025

(54) ELECTRONIC DEVICE AND CAMERA ASSEMBLY

(71) Applicant: HUAWEI TECHNOLOGIES CO., LTD., Guangdong (CN)

(72) Inventors: Chaofan Guo, Dongguan (CN); Huang Shen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 108 days.

(21) Appl. No.: 18/284,760

(22) PCT Filed: Mar. 29, 2022

(86) PCT No.: PCT/CN2022/083537
§ 371 (c)(1),
(2) Date: Sep. 28, 2023

(87) PCT Pub. No.: WO2022/213842
PCT Pub. Date: Oct. 13, 2022

(65) Prior Publication Data
US 2024/0171664 A1  May 23, 2024

(30) Foreign Application Priority Data

Apr. 8, 2021 (CN) .......................... 202110379750.4
May 14, 2021 (CN) .......................... 202110528687.6

(51) Int. Cl.
*H04M 1/02* (2006.01)
*H04N 23/51* (2023.01)
(Continued)

(52) U.S. Cl.
CPC ....... *H04M 1/0264* (2013.01); *H04M 1/0237* (2013.01); *H04N 23/51* (2023.01); *H04N 23/57* (2023.01); *H04N 23/90* (2023.01)

(58) Field of Classification Search
CPC combination set(s) only.
See application file for complete search history.

(56) References Cited

U.S. PATENT DOCUMENTS

| | | | | |
|---|---|---|---|---|
| 10,165,162 B2* | 12/2018 | Eromaki | ................ | H05K 1/145 |
| 2003/0174240 A1* | 9/2003 | Wada | .................. | H04M 1/0264 348/374 |

(Continued)

FOREIGN PATENT DOCUMENTS

| CN | 109681733 A | 4/2019 |
|---|---|---|
| CN | 109981951 A | 7/2019 |

(Continued)

*Primary Examiner* — Mekonnen D Dagnew
(74) *Attorney, Agent, or Firm* — WOMBLE BOND DICKINSON (US) LLP

(57) ABSTRACT

An electronic device discloses a transmission push rod in transmission connection with a camera carrier. The transmission push rod is provided with a transmission portion capable of adjusting a working attitude. When the transmission push rod generates a tilting trend relative to the camera carrier, the transmission portion that presses against a transmission surface by using a transmission end is capable of changing a working attitude relative to a body of the transmission push rod, and the transmission end keeps in line contact with the transmission surface. Therefore, for the tilting phenomenon, a self-adaptive capability is provided, so that a tilting trend of the camera carrier generated with the transmission push rod can be avoided, and a phenomenon of getting stuck is avoided.

21 Claims, 14 Drawing Sheets

(51) Int. Cl.
*H04N 23/57* (2023.01)
*H04N 23/90* (2023.01)

(56) References Cited

U.S. PATENT DOCUMENTS

2020/0238910 A1* 7/2020 Wilson .................... H04N 7/18
2020/0344338 A1* 10/2020 Yang .................. H04M 1/0254
2023/0127253 A1* 4/2023 Liu ....................... G03B 30/00
353/101

FOREIGN PATENT DOCUMENTS

| CN | 110445965 A | 11/2019 |
| CN | 212251831 U | 12/2020 |
| WO | 2020235899 A1 | 11/2020 |

* cited by examiner

ELECTRONIC DEVICE AND CAMERA ASSEMBLY

CROSS-REFERENCE TO RELATED APPLICATION

This application is a National Stage of International Patent Application No. PCT/CN2022/083537 filed on Mar. 29, 2022, which claims priority to Chinese Patent Application No. 202110528687.6 filed on May 14, 2021, and Chinese Patent Application No. 202110379750.4 filed on Apr. 8, 2021. All of the aforementioned applications are hereby incorporated by reference in their entireties.

TECHNICAL FIELD

Embodiments of this application relate to the field of terminals, and in particular, to an electronic device and a camera assembly.

BACKGROUND

With the development of terminal technologies, a large-screen electronic device using a pop-up camera on the market has become a design trend. The pop-up camera is used in an electronic device, for example, but not limited to, a smart television, a notebook computer, and a display.

In a conventional technology, a unilaterally-driven design is usually used in the pop-up camera. Due to a limitation of a force feature of the unilaterally-driven design, the camera is prone to a tilt under an action of unbalanced load, and there is a risk of getting stuck in a raising/lowering action.

SUMMARY

Embodiments of this application provide an electronic device and a camera assembly, to effectively avoid, through structure optimization, a problem of getting stuck in a process of raising/lowering a camera.

A first aspect of an embodiment of this application provides an electronic device. A camera assembly of the electronic device includes a camera carrier and a transmission mechanism. A camera module is disposed on a body of the camera carrier, and a sliding adaptation pair is provided between the camera carrier and an electronic device housing, to drive, along a first direction, the camera module to generate displacement and be switched between a retracted working position and a protruding working position relative to an electronic device body. The transmission mechanism includes a transmission push rod that is in transmission connection with the camera carrier. A body of the transmission push rod is disposed along a second direction, a first end of the transmission push rod is capable of being in transmission connection with a power output end of an actuation component, and a second end of the transmission push rod is provided with a transmission portion formed by extending from the body, to provide power for a raising/lowering action of the camera module. On a plane formed by the first direction and the second direction, the transmission portion may adjust a working attitude relative to the body of the transmission push rod. A transmission surface that abuts against a transmission end of the transmission portion in the first direction is disposed on the camera carrier, and is configured as follows: when the transmission push rod generates a tilting trend relative to the camera carrier, the transmission portion that presses against the transmission surface by using the transmission end is capable of changing a working attitude relative to the body of the transmission push rod, and the transmission end of the transmission portion keeps in line contact with the transmission surface. In this way, when the transmission push rod deviates from a desired design position relative to the camera carrier, for example, but not limited to, a tilt caused by a processing error, an assembling error, and wear of an adaptation accessory, based on a constraint of the sliding adaptation pair on the camera carrier, the transmission surface may press against the transmission portion, so as to change a working attitude relative to the body of the transmission push rod and provide a self-adaptive capability for the tilting phenomenon, and the transmission end keeps in line contact with the transmission surface, so that a force born by the camera carrier in the self-adaptive process is effectively controlled, thereby avoiding a tilting trend of the camera carrier generated with the transmission push rod, ensuring action performance of the camera carrier for smoothly switching a working position along the first direction, and avoiding getting stuck.

Based on the first aspect, an embodiment of the application further provides a first implementation of the first aspect. The transmission portion may be an elastic arm formed by extending from the body, and a movable end of the elastic arm forms the transmission end that fits the transmission surface, and the elastic arm is configured to be capable of being deformed on the plane relative to the body of the transmission push rod under pressing of the transmission surface, to change a working attitude. The elastic arm has features of a simple structure and reliability.

For example, a pressed and deformed area of the elastic arm may be formed in a position in which the elastic arm is connected to the body of the transmission push rod, or may be formed in an extension end area of the elastic arm, or may be a whole elastic arm that may be pressed and deformed.

Based on the first aspect, an embodiment of the application further provides a second implementation of the first aspect. A reverse driving transmission surface is disposed on the camera carrier, and correspondingly, a reverse driving adaptation portion that is disposed opposite to the reverse driving transmission surface in the first direction is disposed in a middle section of the body of the transmission push rod, and is configured as follows: in a normal state, there is a predetermined distance between the reverse driving transmission surface and the reverse driving adaptation portion. In this way, in an operation process in which the transmission push rod pushes the camera carrier to protrude or retract, based on a setting of the predetermined distance, the reverse driving transmission surface and the reverse driving adaptation portion are separated from each other, and no action interference is generated. Under an action of a reverse driving force, after the elastic arm is pressed by the transmission surface and is deformed, the reverse driving transmission surface presses against the reverse driving adaptation portion, to push the transmission push rod to generate displacement. To be specific, when a reverse driving operation is performed on the camera carrier, the transmission portion first changes a working attitude under pressing of the transmission surface, until the reverse driving transmission surface presses against the reverse driving adaptation portion on the transmission push rod, to further push the transmission push rod by using the reverse driving adaptation portion. Herein, the reverse driving force applied to the transmission push rod is applied to a middle position of the body of the transmission push rod, that is, the reverse driving adaptation portion is relatively close to the actuation component, and the reverse driving torque is relatively small. A corresponding operation may be completed by applying a relatively small reverse driving force. This provides better user experience.

For example, the reverse driving adaptation portion is configured as at least two convex ribs that are disposed on the transmission push rod at intervals, and the reverse driving force is transmitted by using two force-bearing points, so that the transmission push rod may be prevented from being subjected to an unbalanced force.

Based on the first aspect, the first implementation of the first aspect, or the second implementation of the first aspect, an embodiment of the application further provides a third implementation of the first aspect. The second end of the transmission push rod may be further provided with a connection portion, and a limiting pair in a third direction is configured between the connection portion and the camera carrier. After members are assembled, a relative position relationship between the transmission push rod and the camera carrier is kept, so that a pressing and adaptation relationship is always maintained between the movable end of the elastic arm and the transmission surface of the camera carrier, thereby ensuring action performance of a corresponding operation. In addition, the connection portion is elastically connected to the camera carrier in the first direction and the second direction, where the third direction is perpendicular to the first direction and the second direction. In this way, when the reverse driving force is applied, a position in which the connection portion is located is not affected by the reverse driving force, so that a case in which the transmission push rod and associated members are damaged due to an excessively large reverse driving force can be avoided.

Based on the first aspect, the first implementation of the first aspect, the second implementation of the first aspect, or the third implementation of the first aspect, an embodiment of the application further provides a fourth implementation of the first aspect. One of the connection portion and the camera carrier is provided with a convex column, and the other is provided with a concave portion. The convex column is formed by extending along the third direction and is disposed in the concave portion, and a first elastic sleeve is disposed between the convex column and the concave portion, to construct an elastic connection between the connection portion and the camera carrier in the first direction and the second direction. On the basis of meeting the elastic connection, the structure is reasonable and reliable, and disassembling and assembling operations can be implemented quickly.

In actual application, there may be a radial gap between an outer periphery surface of the first elastic sleeve and a side wall of the concave portion. In this way, under an action of a reverse driving force, the radial gap provides redundant displacement space, that is, the first elastic sleeve does not bear a force at an initial stage of generating radial relative displacement between the convex column and the concave portion, so that a case in which members are damaged due to an excessively large reverse driving force can be effectively avoided.

For example, a stepped hole may be disposed on the connection portion. A large-size hole segment of the stepped hole forms the concave portion that fits the convex column, the convex column is formed on the camera carrier, and a threaded fastener is used to pass through a small-size hole segment of the stepped hole and is connected to the convex column, thereby constructing the limiting pair between the connection portion and the camera carrier in the third direction.

Based on the first aspect, the first implementation of the first aspect, the second implementation of the first aspect, the third implementation of the first aspect, or the fourth implementation of the first aspect, an embodiment of the application further provides a fifth implementation of the first aspect. The transmission end of the transmission portion abuts against a middle position of the transmission surface, and the middle position overlaps a symmetric center line of the camera carrier along the first direction. To be specific, in a process in which the transmission push rod pushes the camera carrier up and down, an area in which the transmission end keeps in line contact with the transmission surface overlaps a symmetric center of the camera carrier along the first direction, so that impact of unbalanced load on action performance can be avoided to the greatest extent.

In actual application, on a projection plane formed along the third direction, the transmission end that keeps in line contact with the transmission surface may be configured to be convex arc-shaped.

Based on the first aspect, the first implementation of the first aspect, the second implementation of the first aspect, the third implementation of the first aspect, the fourth implementation of the first aspect, or the fifth implementation of the first aspect, an embodiment of the application further provides a sixth implementation of the first aspect. Two groups of transmission portions and transmission surfaces are correspondingly provided. In the first direction, a first transmission portion and a second transmission portion are disposed symmetrically relative to the body of the transmission push rod. Correspondingly, a first transmission surface is located on one side of the first transmission portion in the first direction, to drive, by using the transmission push rod, the camera module to be switched to the protruding working position, and a second transmission surface is located on the other side of the second transmission portion in the first direction, to drive, by using the transmission push rod, the camera module to be switched to the retracted working position. In this way, bidirectional switching of a working position can be controlled.

Based on the first aspect, the first implementation of the first aspect, the second implementation of the first aspect, the third implementation of the first aspect, the fourth implementation of the first aspect, the fifth implementation of the first aspect, or the sixth implementation of the first aspect, an embodiment of the application further provides a seventh implementation of the first aspect. Two groups of reverse driving adaptation portions and reverse driving transmission surfaces are correspondingly provided. In the first direction, a first reverse driving adaptation portion and a second reverse driving adaptation portion are disposed symmetrically relative to the body of the transmission push rod. Correspondingly, a first reverse driving transmission surface is located on one side of the first reverse driving adaptation portion in the first direction, to push the transmission push rod by using the camera carrier located in the retracted working position, and a second reverse driving transmission surface is located on the other side of the second reverse driving adaptation portion in the first direction, to push the transmission push rod by using the camera carrier located in the protruding working position. In this way, a function of a bidirectional reverse driving operation can be achieved.

Based on the seventh implementation of the first aspect, an embodiment of the application further provides an eighth implementation of the first aspect. The camera carrier is provided with a transmission groove disposed along the second direction, the first transmission surface and the second transmission surface are respectively formed in middle areas of groove walls on two sides of the transmission groove, and the first reverse driving transmission surface and the second reverse driving transmission surface are respectively formed in side areas of the groove walls on the two sides of the transmission groove that are close to the actuation component. In this way, working surfaces for normal driving and reverse driving operations are both located on the groove walls of the transmission groove, and a part of a body of the second end of the transmission push rod is disposed in the transmission groove. The overall structure is of relatively high integration and meets a design trend of miniaturization and thinning of a product on the basis of reasonably controlling manufacturing and assembling costs.

Based on the first aspect, the first implementation of the first aspect, the second implementation of the first aspect, the third implementation of the first aspect, the fourth implementation of the first aspect, the fifth implementation of the first aspect, the sixth implementation of the first aspect, the seventh implementation of the first aspect, or the eighth implementation of the first aspect, an embodiment of the application further provides a ninth implementation of the first aspect. A buffer adaptation pair is provided between the camera carrier and the electronic device housing, and the buffer adaptation pair is configured to generate buffer damping when the camera carrier generates displacement and is switched to a critical position of the protruding working position. In this way, when the camera carrier is driven along the first direction to approach the protruding working position, an instantaneous shock generated when the camera carrier reaches the position can be avoided based on the action of the buffer damping, thereby avoiding a jitter generated when the camera reaches the position. In addition, based on the buffer adaptation pair, the camera carrier is always affected by the buffer damping in a protruding working state, which is equivalent to constructing a flexible connection relationship between the camera carrier and the electronic device housing. This can further avoid a problem of a video image jitter caused by a vibration in a using state, for example, but not limited to impact caused by resonance when the electronic device is used in a bass interaction scenario.

Based on the ninth implementation of the first aspect, an embodiment of the application further provides a tenth implementation of the first aspect. The electronic device housing is provided with a first mounting column formed by extending along the third direction, and a second elastic sleeve is sleeved on the first mounting column. Correspondingly, the camera carrier is provided with an adaptation body formed by extending to a side, where the adaptation body is provided with a slope that presses against and fits the second elastic sleeve, to construct the buffer adaptation pair, and is configured as follows: in a process in which the camera carrier is switched from the critical position to the protruding working position, press deformation of the second elastic sleeve gradually increases. In this way, in a process in which the camera module gradually reaches the protruding working position, press deformation gradually increases, so that the buffer damping is gradually improved. This provides better user experience.

Based on the tenth implementation of the first aspect, an embodiment of the application further provides an eleventh implementation of the first aspect. A plurality of elastic teeth evenly distributed in a circumferential direction are disposed on an inner wall of the second elastic sleeve, and there are tooth gaps between adjacent elastic teeth. In this way, in a process in which the slope of the adaptation body on the side of the camera carrier presses against the second elastic sleeve, tooth gaps of the inner side of the second elastic sleeve provide redundant deformation space. This can further improve buffering damping.

For example, two groups of second elastic sleeves and adaptation bodies may be correspondingly provided and be symmetrically disposed on two sides of the camera carrier. This can avoid unbalanced load on the camera carrier in a buffering and positioning process.

Based on the ninth implementation of the first aspect, an embodiment of the application further provides a twelfth implementation of the first aspect. The camera carrier is provided with a second mounting column formed by extending along the first direction, and a third elastic sleeve is sleeved on the second mounting column. Correspondingly, an adaptation hole is disposed on the electronic device housing, where a hole edge of the adaptation hole is provided with a chamfer that presses against and fits the third elastic sleeve, to construct the buffer adaptation pair. Similarly, in a process in which the camera module gradually reaches the protruding working position, the buffer damping is gradually improved. This provides better user experience.

Based on the twelfth implementation of the first aspect, an embodiment of the application further provides a thirteenth implementation of the first aspect. A pressing side of the third elastic sleeve is provided with a chamfer. Similarly, when the third elastic sleeve presses against the adaptation hole, the chamfer on the pressing side of the third elastic sleeve provides redundant deformation space. This can further improve buffering damping.

For example, two groups of third elastic sleeves and adaptation holes are correspondingly provided and are symmetrically disposed on the two sides of the camera carrier. This can avoid unbalanced load on the camera carrier in the buffering and positioning process.

Based on the first aspect, the first implementation of the first aspect, the second implementation of the first aspect, the third implementation of the first aspect, the fourth implementation of the first aspect, the fifth implementation of the first aspect, the sixth implementation of the first aspect, the seventh implementation of the first aspect, the eighth implementation of the first aspect, the ninth implementation of the first aspect, the tenth implementation of the first aspect, the eleventh implementation of the first aspect, the twelfth implementation of the first aspect, or the thirteenth implementation of the first aspect, an embodiment of the application further provides a fourteenth implementation of the first aspect. The camera module is embedded and fastened in the camera carrier, and a field of view of the camera module is tilted forward. In this way, compared with a conventional solution in which a camera is configured in a head-up manner, in this implementation, an upper visible field of view range is fully used, and a waste of an upper half area of the field of view is reduced, thereby improving field of view utilization. On the basis that camera module configuration is unchanged, a large field of view function of the camera is implemented, and application interaction and exchange covering a whole body at a short distance can be met without increasing camera configuration costs. In addition, a large field of view of the camera does not need to be manually adjusted during use. This provides better user experience.

Based on the fourteenth implementation of the first aspect, an embodiment of the application further provides a fifteenth implementation of the first aspect. A glass cover is sealed and fixed in a through opening of the camera carrier, an inner side of the through opening is provided with a mounting concave portion, a part of the camera module is clamped into the mounting concave portion, there is an included angle between a bottom surface of the mounting concave portion and a plane on which the first direction and the second direction are located, and a part of an outer periphery of the camera module between the mounting concave portion and the glass cover is sleeved with a profiled moldable sealing silicone. In this way, the camera module is limited and constrained jointly by the mounting concave portion and the profiled moldable sealing silicone. A first ring seal is formed between a first end of the profiled moldable sealing silicone and the glass cover, and a second ring seal is formed between a second end of the profiled moldable sealing silicone and the mounting concave portion, thereby constructing a seal of the camera module and providing overall good sealing and reliable limiting.

Based on the first aspect, the first implementation of the first aspect, the second implementation of the first aspect, the third implementation of the first aspect, the fourth implementation of the first aspect, the fifth implementation of the first aspect, the sixth implementation of the first aspect, the seventh implementation of the first aspect, the eighth implementation of the first aspect, the ninth implementation of the first aspect, the tenth implementation of the first aspect, the eleventh implementation of the first aspect, the twelfth implementation of the first aspect, the thirteenth implementation of the first aspect, the fourteenth implementation of the first aspect, or the fifteenth implementation of the first aspect, an embodiment of the application further provides a sixteenth implementation of the first aspect. The sliding adaptation pair between the camera carrier and the electronic device housing includes two groups of sliding rails and sliding slots that are parallel to each other and fits each other in a slidable manner along the first direction. In this way, in a process of working position switching, displacement precision of the camera carrier along the first direction can be kept, thereby avoiding a phenomenon of getting stuck.

In some actual applications, the sliding rails may be disposed on the electronic device housing, and correspondingly, the sliding slots are disposed on the camera carrier; or the sliding rails may be disposed on the camera carrier, and correspondingly, the sliding slots are disposed on the electronic device housing.

For example, when the sliding rails are disposed on the electronic device housing, the sliding rails may be made of a POM material, and have a good self-lubricating capability for adaptation in a slidable manner.

For example, when the sliding rails are disposed on the camera carrier, the camera carrier may have a split structure based on requirements for product functions and include a fixedly connected camera fixing base and a sliding rail matrix on which the sliding rails are disposed. The sliding rail matrix may be made of a POM material, and the camera fixing base configured to mount the camera module may be made of a material such as metal.

Based on the first aspect, the first implementation of the first aspect, the second implementation of the first aspect, the third implementation of the first aspect, the fourth implementation of the first aspect, the fifth implementation of the first aspect, the sixth implementation of the first aspect, the seventh implementation of the first aspect, the eighth implementation of the first aspect, the ninth implementation of the first aspect, the tenth implementation of the first aspect, the eleventh implementation of the first aspect, the twelfth implementation of the first aspect, the thirteenth implementation of the first aspect, the fourteenth implementation of the first aspect, the fifteenth implementation of the first aspect, or the sixteenth implementation of the first aspect, an embodiment of the application further provides a seventeenth implementation of the first aspect. The transmission mechanism further includes a screw rod and nut transmission pair, where a screw nut of the screw rod and nut transmission pair is fixedly disposed at the first end of the transmission push rod, and two ends of a screw rod of the screw rod and nut transmission pair are pivotally connected to a fixed support. The actuation component may be a motor, and an output shaft of the motor is in transmission connection with the screw rod. The structure is simple and reliable, and control precision of work position switching can be obtained.

A second aspect of an embodiment of the application provides a camera assembly used in an electronic device. The camera assembly includes a camera carrier and a transmission mechanism. A camera module is disposed on a body of the camera carrier of the camera assembly, and a sliding adaptation pair is provided between the camera carrier and an electronic device housing, to drive, along a first direction, the camera module to generate displacement and be switched between a retracted working position and a protruding working position relative to the camera assembly housing. The transmission mechanism of the camera assembly includes a transmission push rod that is in transmission connection with the camera carrier. A body of the transmission push rod is disposed along a second direction, a first end of the transmission push rod is capable of being in transmission connection with a power output end of an actuation component, and a second end of the transmission push rod is provided with a transmission portion formed by extending from the body. A transmission surface is disposed on the camera carrier, and the transmission surface abuts against a transmission end of the transmission portion in the first direction. On a plane formed by the first direction and the second direction, the transmission portion is capable of changing a working attitude relative to the body of the transmission push rod, and the transmission end keeps in line contact with the transmission surface. In this way, when the transmission push rod deviates from a desired design position relative to the camera carrier, based on a constraint of the sliding adaptation pair on the camera carrier, the transmission surface may press against the transmission portion, so as to change a working attitude relative to the body of the transmission push rod and provide a self-adaptive capability for the tilting phenomenon, and the transmission end keeps in line contact with the transmission surface, so that a force born by the camera carrier in the self-adaptive process is effectively controlled, thereby avoiding a tilting trend of the camera carrier generated with transmission push rod, ensuring action performance of the camera carrier for smoothly switching a working position along the first direction, and avoiding getting stuck.

Based on the second aspect, an embodiment of the application further provides a first implementation of the second aspect. The transmission portion may be an elastic arm formed by extending from the body, and a movable end of the elastic arm forms the transmission end that fits the transmission surface, and the elastic arm is configured to be capable of being deformed on the plane relative to the body of the transmission push rod under pressing of the transmission surface, to change a working attitude. A simple and reliable structure is provided.

Based on the second aspect or the first implementation of the second aspect, an embodiment of the application further provides a second implementation of the second aspect. A reverse driving transmission surface is disposed on the camera carrier, and correspondingly, a reverse driving adaptation portion that is disposed opposite to the reverse driving transmission surface in the first direction is disposed in a middle section of the body of the transmission push rod, and is configured as follows: in a normal state, there is a predetermined distance between the reverse driving transmission surface and the reverse driving adaptation portion. In this way, in an operation process in which the transmission push rod pushes the camera carrier to protrude or retract, based on a setting of the predetermined distance, the reverse driving transmission surface and the reverse driving adaptation portion are separated from each other, and no action interference is generated. Under an action of a reverse driving force, after the elastic arm is pressed by the transmission surface and is deformed, the reverse driving transmission surface presses against the reverse driving adaptation portion, to push the transmission push rod to generate displacement. To be specific, when a reverse driving operation is performed on the camera carrier, the transmission portion first changes a working attitude under pressing of the transmission surface, until the reverse driving transmission surface presses against the reverse driving adaptation portion on the transmission push rod, to further push the transmission push rod by using the reverse driving adaptation portion. Herein, the reverse driving force applied to the transmission push rod is applied to a middle position of the body of the transmission push rod, that is, the reverse driving adaptation portion is relatively close to the actuation component, and the reverse driving torque is relatively small. A corresponding operation may be completed by applying a relatively small reverse driving force. This provides better user experience.

Based on the second aspect, the first implementation of the second aspect, or the second implementation of the second aspect, an embodiment of the application further provides a third implementation of the second aspect. The second end of the transmission push rod may be further provided with a connection portion, and a limiting pair in a third direction is configured between the connection portion and the camera carrier. After members are assembled, a relative position relationship between the transmission push rod and the camera carrier is kept, so that a pressing and adaptation relationship is always maintained between the movable end of the elastic arm and the transmission surface of the camera carrier, thereby ensuring action performance of a corresponding operation. In addition, the connection portion is elastically connected to the camera carrier in the first direction and the second direction, where the third direction is perpendicular to the first direction and the second direction. In this way, when the reverse driving force is applied, a position in which the connection portion is located is not affected by the reverse driving force, so that a case in which the transmission push rod and associated members are damaged due to an excessively large reverse driving force can be avoided.

Based on the second aspect, the first implementation of the second aspect, the second implementation of the second aspect, or the third implementation of the second aspect, an embodiment of the application further provides a fourth implementation of the second aspect. One of the connection portion and the camera carrier is provided with a convex column, and the other is provided with a concave portion. The convex column is formed by extending along the third direction and is disposed in the concave portion, and a first elastic sleeve is disposed between the convex column and the concave portion, to construct an elastic connection between the connection portion and the camera carrier in the first direction and the second direction. On the basis of meeting the elastic connection, the structure is reasonable and reliable, and disassembling and assembling operations can be implemented quickly.

Based on the second aspect, the first implementation of the second aspect, the second implementation of the second aspect, the third implementation of the second aspect, or the fourth implementation of the second aspect, an embodiment of the application further provides a fifth implementation of the second aspect. Two groups of transmission portions and transmission surfaces are correspondingly provided. In the first direction, a first transmission portion and a second transmission portion are disposed symmetrically relative to the body of the transmission push rod. Correspondingly, a first transmission surface is located on one side of the first transmission portion in the first direction, to drive, by using the transmission push rod, the camera module to be switched to the protruding working position, and a second transmission surface is located on the other side of the second transmission portion in the first direction, to drive, by using the transmission push rod, the camera module to be switched to the retracted working position. In this way, bidirectional switching of a working position can be controlled.

Based on the second aspect, the first implementation of the second aspect, the second implementation of the second aspect, the third implementation of the second aspect, the fourth implementation of the second aspect, or the fifth implementation of the second aspect, an embodiment of the application further provides a sixth implementation of the second aspect. Two groups of reverse driving adaptation portions and reverse driving transmission surfaces are correspondingly provided. In the first direction, a first reverse driving adaptation portion and a second reverse driving adaptation portion are disposed symmetrically relative to the body of the transmission push rod. Correspondingly, a first reverse driving transmission surface is located on one side of the first reverse driving adaptation portion in the first direction, to push the transmission push rod by using the camera carrier located in the retracted working position, and a second reverse driving transmission surface is located on the other side of the second reverse driving adaptation portion in the first direction, to push the transmission push rod by using the camera carrier located in the protruding working position. In this way, a function of a bidirectional reverse driving operation can be achieved.

Based on the sixth implementation of the second aspect, an embodiment of the application further provides a seventh implementation of the second aspect. The camera carrier is provided with a transmission groove disposed along the second direction, the first transmission surface and the second transmission surface are respectively formed in middle areas of groove walls on two sides of the transmission groove, and the first reverse driving transmission surface and the second reverse driving transmission surface are respectively formed in side areas of the groove walls on the two sides of the transmission groove that are close to the actuation component. In this way, working surfaces for normal driving and reverse driving operations are both located on the groove walls of the transmission groove, and a part of a body of the second end of the transmission push rod is disposed in the transmission groove. The overall structure is of relatively high integration and meets a design trend of miniaturization and thinning of a product on the basis of reasonably controlling manufacturing and assembling costs.

Based on the second aspect, the first implementation of the second aspect, the second implementation of the second aspect, the third implementation of the second aspect, the fourth implementation of the second aspect, the fifth implementation of the second aspect, the sixth implementation of the second aspect, or the seventh implementation of the second aspect, an embodiment of the application further provides an eighth implementation of the second aspect. The camera module is embedded and fastened in the camera carrier, and a field of view of the camera module is tilted forward. In this way, compared with a conventional solution in which a camera is configured in a head-up manner, in this implementation, an upper visible field of view range is fully used, and a waste of an upper half area of the field of view is reduced, thereby improving field of view utilization. On the basis that camera module configuration is unchanged, a large field of view function of the camera is implemented, and application interaction and exchange covering a whole body at a short distance can be met without increasing camera configuration costs. In addition, a large field of view of the camera does not need to be manually adjusted during use. This provides better user experience.

A third aspect of an embodiment of the application provides an electronic device, including the camera assembly according to the second aspect.

DESCRIPTION OF EMBODIMENTS

Embodiments of this application provide a novel pop-up camera solution, to ensure smooth switching between working positions of a camera. In application of electronic devices such as a smart television, a notebook computer, and a display, when the camera is enabled, the camera is switched to a protruding working position, and in a non-working state, is switched to a retracted working position, so as to hide on a body side of the electronic device, thereby protecting user privacy.

Without loss of generality, in embodiments, an electronic device 1 for switching a working position of a camera module in a pop-up manner is used as a description body to describe in detail composition and a function principle of a camera assembly. It should be understood that, based on overall designs of products of different types, the working position of the camera module may alternatively be switched in a lateral displacement manner, that is, the camera module is switched to the protruding working position or the retracted working position in the lateral displacement manner.

For ease of description, three directions are defined for the electronic device in this specification. A first direction X is a pop-up displacement direction of a camera carrier, a second direction Y is an arrangement direction of a body of a transmission push rod that drives the camera carrier to generate displacement, and a third direction Z is a direction perpendicular to a plane formed by the first direction X and the second direction Y.

Embodiment 1

Figure 1:
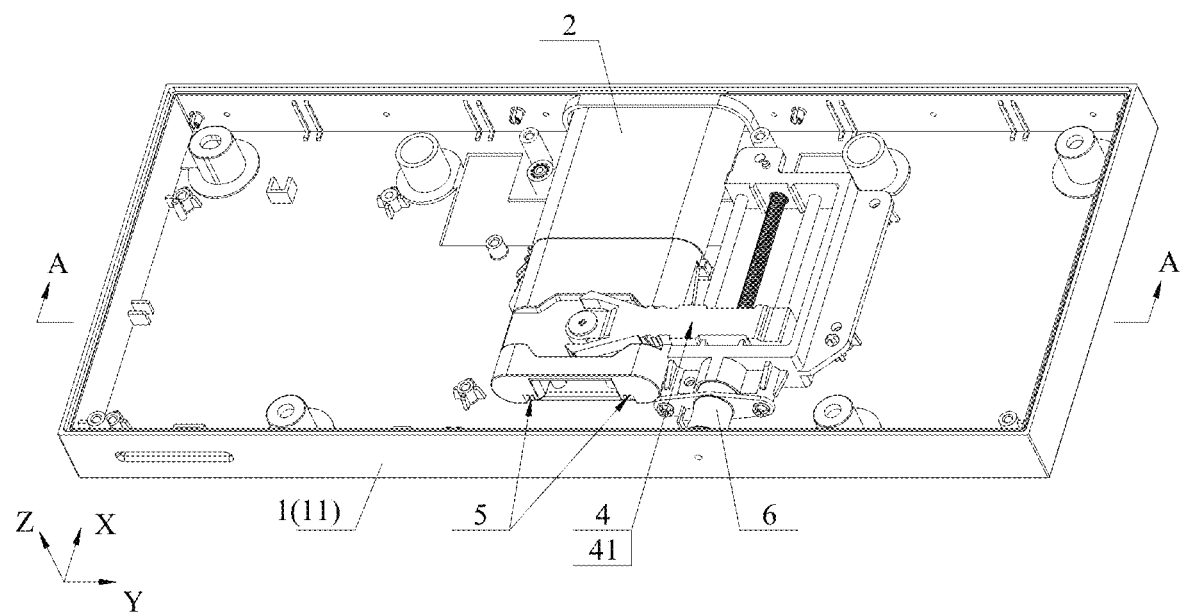
FIG. 1 is a schematic diagram of an overall structure of a camera of an electronic device located in a retracted working position according to Embodiment 1 of the present disclosure.

Refer to FIG. 1. In an embodiment, a camera module 3 is disposed on a camera carrier 2, and a sliding adaptation pair 5 is disposed between the camera carrier 2 and a housing 11 of an electronic device 1, to drive the camera module 3 to move upward/downward. To be specific, along a first direction X, a working position of the camera module 3 may be switched relative to a body of the electronic device 1. When a camera is located in a retracted working position shown in FIG. 1 and FIG. 2, the camera is hidden, or when the camera is located in a protruding working position shown in FIG. 3 and FIG. 4, the camera is enabled.

It may be understood that, in addition to an existing function of the electronic device housing 11, the electronic device housing 11 further has a function of constructing a fastening and mounting structure of the sliding adaptation pair 5, namely, a non-action part for mounting and fastening a camera assembly.

Certainly, for a camera assembly having its own housing, a non-action part of the camera assembly is mounted on its own housing (not shown in the figure), to form an assembly component with relatively high integration, so that the assembly component can be quickly mounted on the body of the electronic device 1. In actual application, a choice may be made based on an overall design requirement for a corresponding electronic device.

Figure 2:
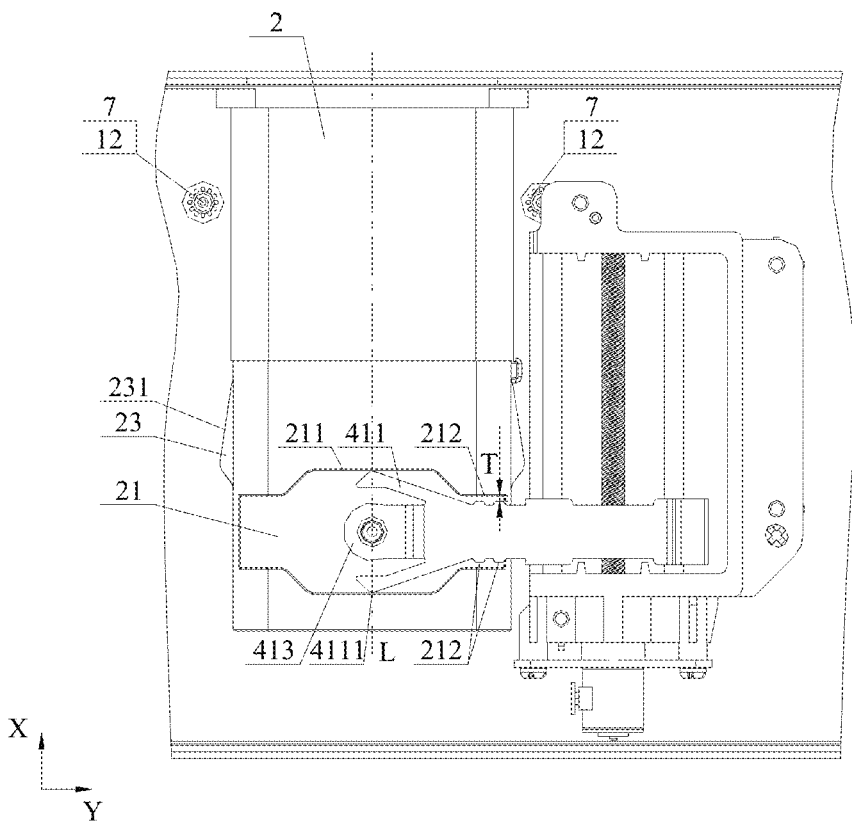
FIG. 2 is a schematic diagram of a partial assembly relationship of a camera assembly shown in FIG. 1.

A transmission mechanism 4 is configured to transmit, to the camera carrier 2, power output by an actuation component 6. In an embodiment, the transmission mechanism 4 is in transmission connection with the camera carrier 2 by using a transmission push rod 41 as a terminal member on a power transmission path. For example, as shown in FIG. 2, a body of the transmission push rod 41 is disposed along a second direction Y, a first end of the transmission push rod 41 is capable of being in transmission connection with a power output end of the actuation component 6, and a second end of the transmission push rod 41 is provided with a transmission portion (411) formed by extending from the body. A transmission surface (211) that abuts against a transmission end 4111 of the transmission portion (411) in the first direction X is disposed on the camera carrier 2. On a plane formed by the first direction X and the second direction Y, a working attitude of the transmission portion (411) may be adjusted relative to the body of the transmission push rod 41. Correspondingly, that is, when the transmission push rod 41 generates a tilting trend relative to the camera carrier 2, the transmission portion (411) that presses against the transmission surface 211 by using the transmission end 4111 is capable of changing a working attitude relative to the body of the transmission push rod 41. In a process of changing the working attitude, the transmission end 4111 keeps in line contact with the transmission surface 211.

"Working attitude" herein means a shape of the transmission portion and a working status presented by the transmission portion relative to the transmission push rod 41 in a using state. Due to a constraint of the sliding adaptation pair 5 on the camera carrier 2, when the transmission push rod 41 deviates from a desired design position relative to the camera carrier 2, under pressing of the transmission surface 211, the working attitude of the transmission portion of the transmission push rod 41 is changed, so that the camera assembly has a self-adaptive capability, and the camera carrier 3 does not tilt with the transmission push rod 41. In addition, the transmission end 4111 keeps in line contact with the transmission surface 211, so that the camera carrier 2 bears a relatively small force in the self-adaptive process.

Figure 4:
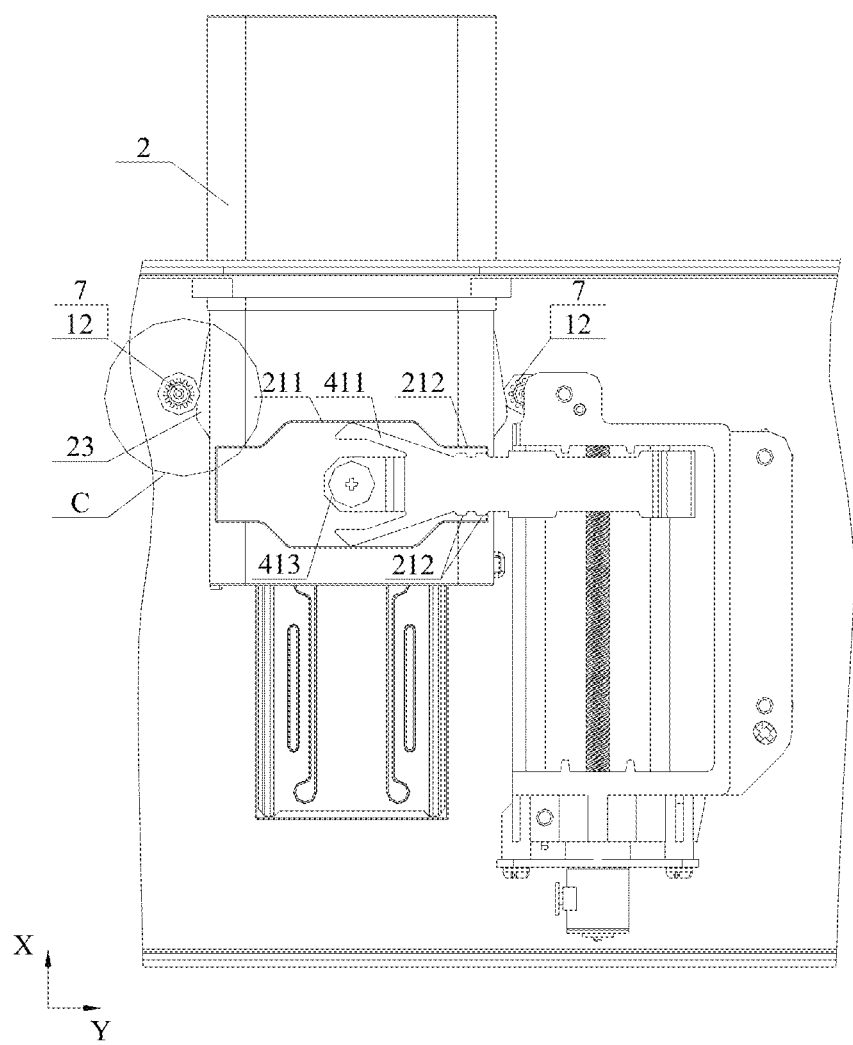
FIG. 4 is a schematic diagram of a partial assembly relationship of a camera assembly shown in FIG. 3.

"Transmission end" herein means a partial area that transmits, to the transmission surface 211, a force for switching the working position and that always fits the transmission surface 211 through line contact in a using state. As shown in FIG. 2 and FIG. 4, the transmission end 4111 is convex arc-shaped. It should be noted that, structure forms of the transmission end and the transmission portion may be determined based on an actual function requirement and a process. By way of example, but not limitation thereto, under pressing of the transmission surface 211, a body structure of the transmission portion is retractable to implement an adaptive change of a working attitude, or a form of an elastic arm 411 that can be deformed relative to the body of the transmission push rod 41 is used.

Figure 5:
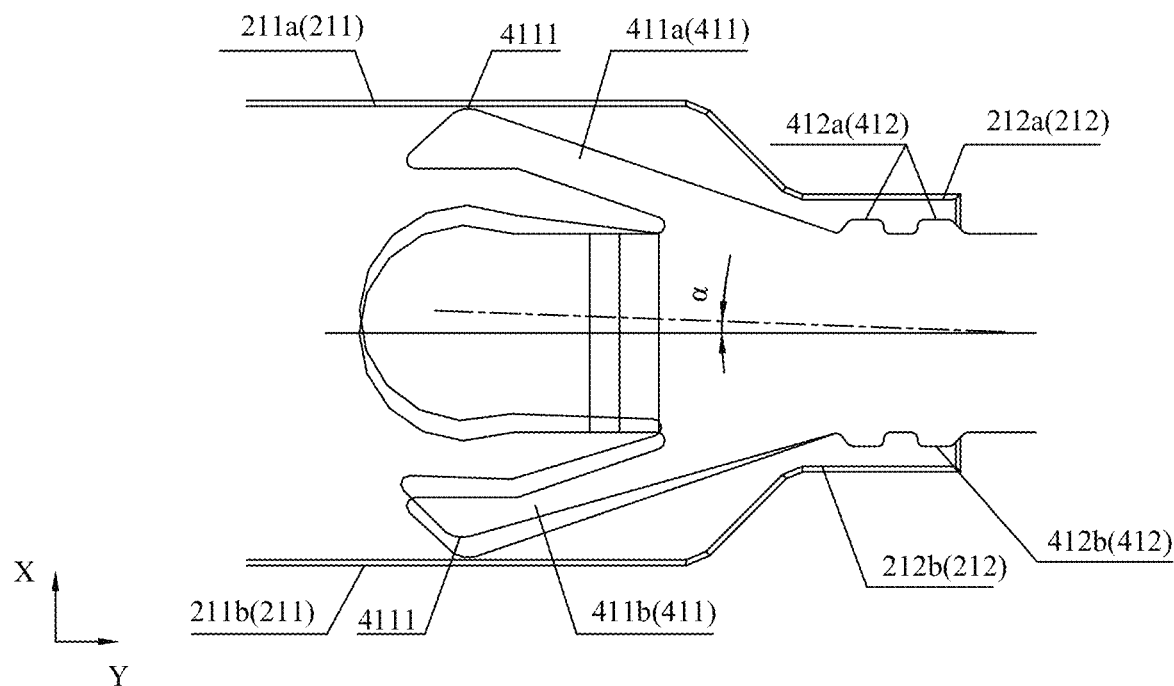
FIG. 5 is a schematic diagram of a principle of changing a working attitude of the transmission push rod according to Embodiment 1 of the present disclosure.

In an embodiment, the transmission portion is an elastic arm 411 formed by extending from the body of the transmission push rod 41, and the transmission end 4111 that fits the transmission surface 211 is formed at a movable end of the elastic arm 411. Under pressing of the transmission surface 211, the elastic arm 411 may be deformed on the plane formed by the first direction X and the second direction Y relative to the body of the transmission push rod 41, to change a working attitude. Refer to FIG. 5 as well. The figure shows working attitudes of the elastic arm 411 before and after deformation in a case in which a second end of the transmission push rod 41 moves upward and is tilted at an angle α.

In an embodiment, a pressed and deformed area of the elastic arm 411 may be formed at a position in which the elastic arm 411 is connected to the body of the transmission push rod 41, or may be formed in an extension end area of the elastic arm 411. Actually, the pressed and deformed area of the elastic arm 411 may be alternatively the entire elastic arm 41 that may be pressed and deformed.

In an embodiment, a first elastic arm 411a and a second elastic arm 411b are disposed on the transmission push rod 41. In an embodiment, the first elastic arm 411a and the second elastic arm 411b are disposed symmetrically relative to the body of the transmission push rod 41. Correspondingly, a first transmission surface 211a is located on one side of the first elastic arm 411a in the first direction X, to drive, by using the transmission push rod 41, the camera module 3 to be switched to the protruding working position. A second transmission surface 211b is located on the other side of the second elastic arm 411b in the first direction X, to drive, by using the transmission push rod 41, the camera module 3 to be switched to the retracted working position. In this way, when the actuation component 6 provides a driving force in a forward direction or a reverse direction, bidirectional control may be implemented by using the transmission push rod 41 of the transmission mechanism 4.

With reference to FIG. 2 and FIG. 4, the transmission end 4111 of the elastic arm 411 abuts against a middle position of the transmission surface 211, and the middle position overlaps a symmetric center line L of the camera carrier 2 along the first direction X, to prevent unbalanced load from affecting action performance.

It may be understood that, based on deformation of the elastic arm 411, a position at which the transmission end 4111 of the elastic arm 411 keeps in line contact with the transmission surface 211 is a non-fixed point. "Overlap" means that, in a process in which the transmission push rod 41 pushes the camera carrier 2 upward/downward, an area in which the transmission end 4111 of the transmission push rod 41 keeps in line contact with the transmission surface 211 overlaps a symmetric center of the camera carrier 2 along the first direction.

In actual application, there is a case in which the user manually operates the camera carrier 2 through reverse driving. To avoid an excessively large reverse driving force, a reverse driving transmission structure is optimized in this solution. With reference to FIG. 2, FIG. 4, and FIG. 5, a reverse driving transmission surface 212 is disposed on the camera carrier 2. Correspondingly, a reverse driving adaptation portion 412 that is disposed opposite to the reverse driving transmission surface 212 in the first direction X is disposed on the transmission push rod 41, and the reverse driving adaptation portion 412 is disposed in a middle section of the body of the transmission push rod 41 and is configured as follows: in a normal state shown in FIG. 2, there is a predetermined distance T between the reverse driving transmission surface 212 and the reverse driving adaptation portion 412. In this way, in an operation process in which the transmission push rod 41 pushes the camera carrier 2 to protrude or retract, based on a setting of the predetermined distance T, the reverse driving transmission surface 212 and the reverse driving adaptation portion 412 are separated from each other, and no action interference is generated. Under an action of a reverse driving force, after the elastic arm 411 is pressed by the transmission surface 211 and is deformed, the reverse driving transmission surface presses against the reverse driving adaptation portion, to push the transmission push rod to generate displacement.

Figure 6:
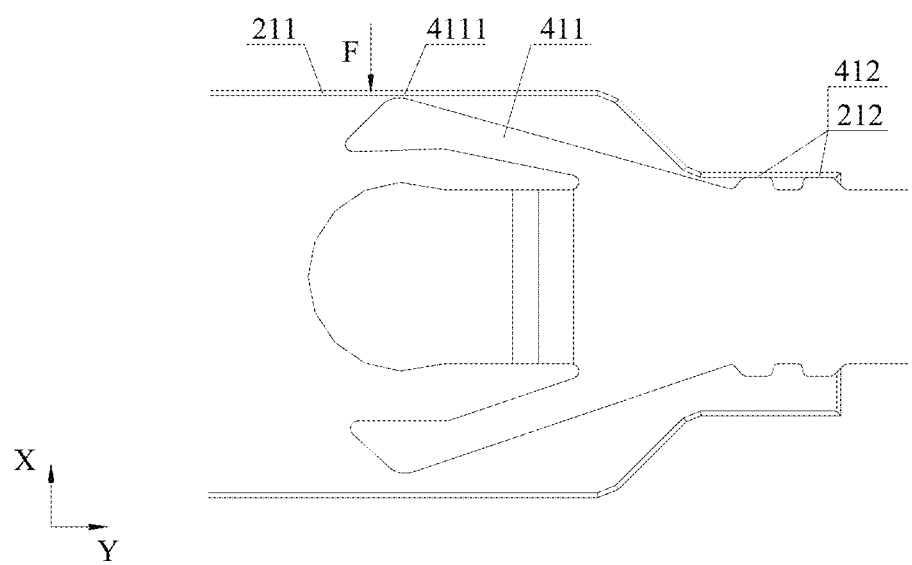
FIG. 6 is a schematic diagram of a principle of the camera assembly under an action of a reverse driving force according to Embodiment 1 of the present disclosure.

Refer to FIG. 6. When a reverse driving operation is performed on the camera carrier, the elastic arm 411 is first deformed under pressing of the transmission surface 211, until the reverse driving transmission surface 212 presses against the reverse driving adaptation portion 412 on the transmission push rod 41, to further push, by using the reverse driving adaptation portion 412, the transmission push rod 41 under an action of a reverse driving force F. The reverse driving force F applied to the transmission push rod is applied to a middle position of the body of the transmission push rod, that is, the reverse driving adaptation portion 412 is relatively close to the actuation component 6. Therefore, the reverse driving torque is relatively small, and a corresponding operation may be completed by applying a relatively small reverse driving force.

To ensure reliability of a dynamic adaptation relationship between the reverse driving adaptation portion 412 and the reverse driving transmission surface 212, and consider a good processing process, as shown in the figure, the reverse driving adaptation portion 412 is configured as two convex ribs that are disposed on the transmission push rod 41 at intervals, and the reverse driving force is transmitted by using two force-bearing positions in which line contact is performed, so that processing and assembling precision is easily controlled, and the transmission push rod may be prevented from being subjected to an unbalanced force.

In an embodiment, two groups of reverse driving adaptation portions 412 and reverse driving transmission surfaces 212 are correspondingly provided. In the first direction X, a first reverse driving adaptation portion 412a and a second reverse driving adaptation portion 412b are disposed symmetrically relative to the body of the transmission push rod 41. Correspondingly, a first reverse driving transmission surface 212a is located on one side of the first reverse driving adaptation portion 412a in the first direction X, to push the transmission push rod 41 by using the camera carrier 2 located in the retracted working position, and the second reverse driving transmission surface 212b is located on the other side of the second reverse driving adaptation portion 412b in the first direction X, to push the transmission push rod 41 by using the camera carrier 2 located in the protruding working position. In this way, a function of a bidirectional reverse driving operation can be achieved.

It should be noted that a manner of disposing the transmission surface 211 and the reverse driving transmission surface 212 may be selected based on an actual requirement. To properly control a thickness of the electronic device, as shown in FIG. 2, the camera carrier 2 is provided with a transmission groove 21 disposed along the second direction Y. With reference to FIG. 5, the first transmission surface 211a and the second transmission surface 211b are respectively formed in middle areas of groove walls on two sides of the transmission groove 21, and the first reverse driving transmission surface 212a and the second reverse driving transmission surface 212b are respectively formed in side areas of the groove walls on the two sides of the transmission groove 21 that are close to the actuation component 6. In this way, working surfaces for normal driving and reverse driving operations are both located on the groove walls on the two sides of the transmission groove 21, and a part of a body of the second end of the transmission push rod 41 is disposed in the transmission groove 21. Space of the camera carrier 2 in the first direction X and the second direction Y is fully used, and an overall structure is of relatively high integration.

After assembling is completed, the first elastic arm 411a and the second elastic arm 411b at the second end of the transmission push rod 41 are disposed in the transmission groove 21, and respectively abut against the corresponding first transmission surface 211a and second transmission surface 211b. To prevent the transmission push rod 41 from being detached from the transmission groove 21 due to a non-normal force, a limiting in a third direction Z may be added to the second end of the transmission push rod 41.

Figure 7:
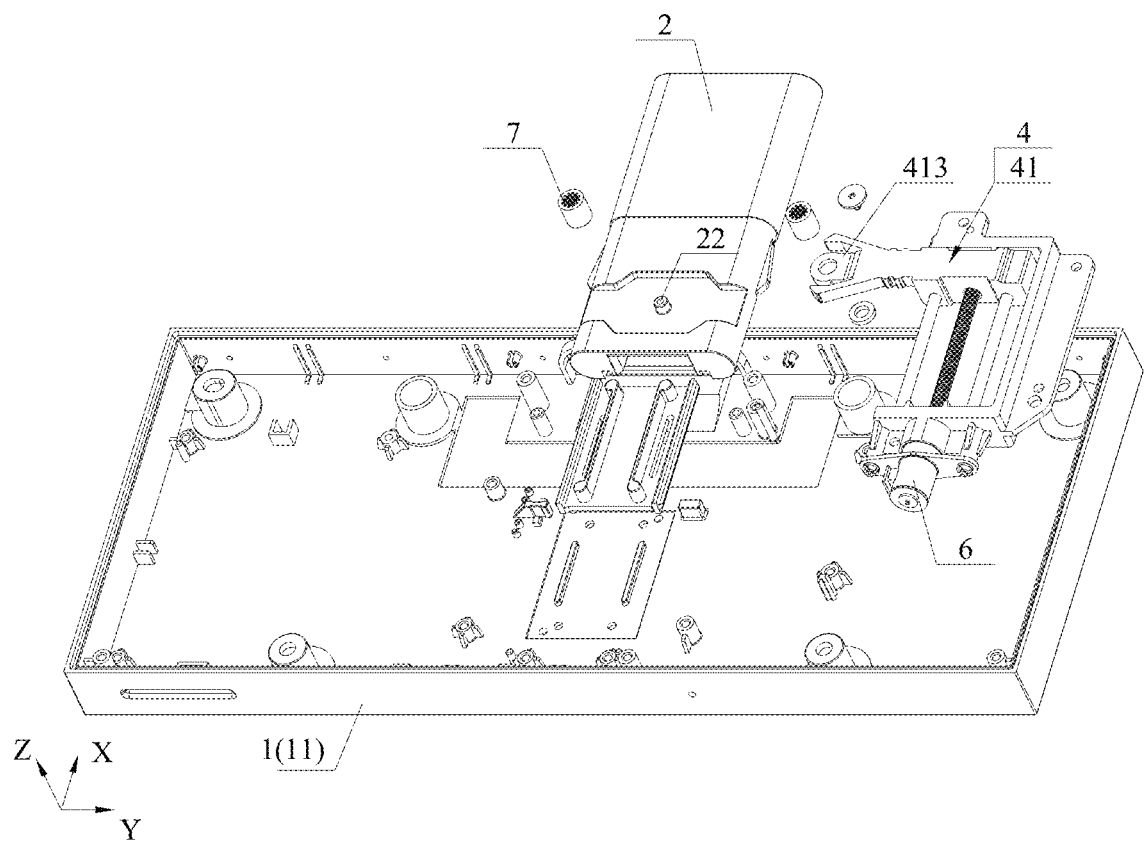
FIG. 7 is an exploded view of assembly of an electronic device according to Embodiment 1 of the present disclosure.
Figure 8:
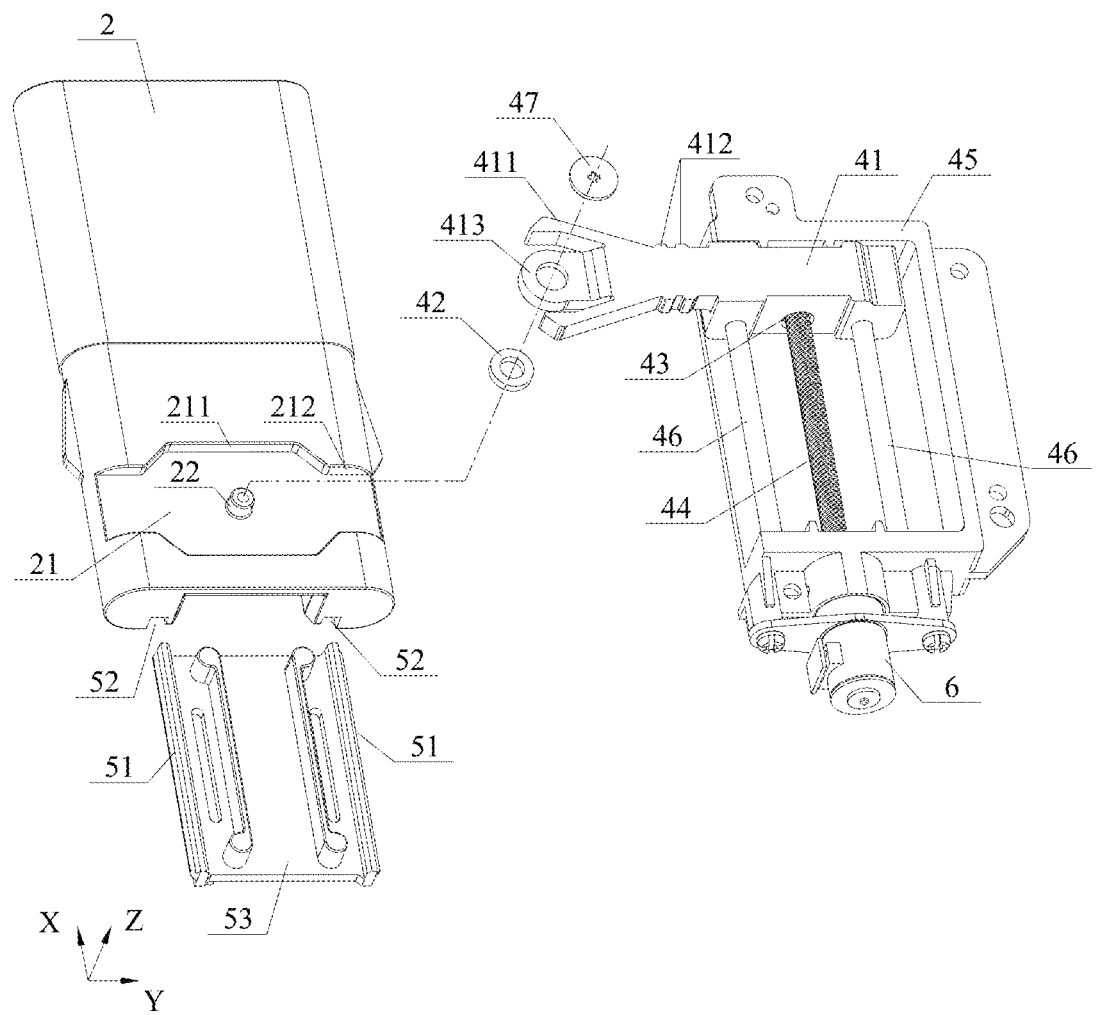
FIG. 8 is an enlarged schematic diagram of a camera assembly shown in FIG. 7.

Refer to FIG. 7 and FIG. 8. The second end of the transmission push rod 41 may be further provided with a connection portion 413, a limiting pair in the third direction Z is configured between the connection portion 413 and the camera carrier 2, and the connection portion 413 is elastically connected to the camera carrier 2 in the first direction X and the second direction Y. After assembling, a pressing and adaptation relationship is always maintained between the movable end of the elastic arm 411 and the transmission surface 211 of the camera carrier 2, thereby ensuring action performance of a corresponding operation. In addition, the connection portion 413 is elastically connected to the camera carrier 2 in the first direction X and the second direction Y. In this way, when the reverse driving force is applied, a position in which the connection portion 413 with an elastic connection relationship is located is not affected by the reverse driving force, so that a case in which the transmission push rod 41 and associated members are damaged due to an excessively large reverse driving force can be avoided.

For example, but not limited to, as shown in FIG. 8, the connection portion 413 is fixed on a groove bottom surface of the transmission groove 21 of the camera carrier by using a threaded fastener 47. As shown in the figure, the first elastic arm 411a and the second elastic arm 411b are symmetrically disposed on two sides of the connection portion 413, and space required for deformation is reserved between the first elastic arm 411a and the second elastic arm 411b and the connection portion 413.

Figure 9:
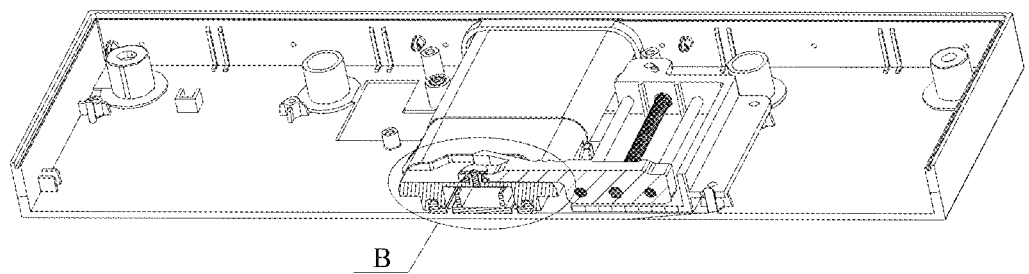
FIG. 9 is a sectional view formed at an A-A sectioned position in FIG. 1.
Figure 10:
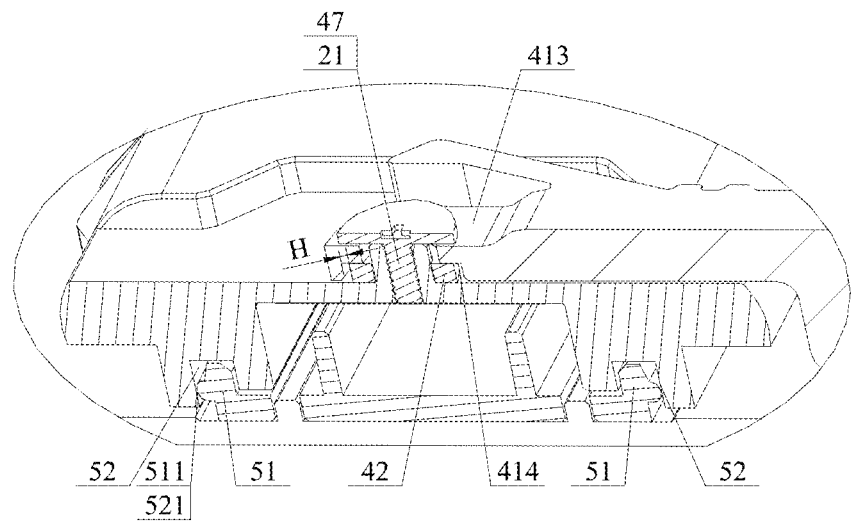
FIG. 10 is an enlarged schematic diagram of a part B in FIG. 9.

For example, but not limited to, the first elastic sleeve 42 is used to construct an elastic connection between the connection portion 413 and the camera carrier 2 in the first direction X and the second direction Y. Refer to FIG. 9 and FIG. 10. The connection portion 413 is provided with a concave portion 414, and the camera carrier 2 is provided with a convex column 22. The convex column 22 is formed by extending along the third direction Z and is disposed in the concave portion 414, and the first elastic sleeve 42 is disposed between the convex column 22 and the concave portion 414.

Certainly, the convex column and the concave portion that fit the first elastic sleeve 42 may also be reversely configured (not shown in the figure), that is, the convex column is disposed on the connection portion, and the concave portion is disposed on the camera carrier 2. After the first elastic sleeve 42 is embedded between the convex column and the concave portion, the foregoing elastic connection relationship may also be established.

Further, as shown in FIG. 10, there may be a radial gap H between an outer periphery surface of the first elastic sleeve 42 and a side wall of the concave portion. In this way, under the action of a reverse driving force, the radial gap H provides redundant displacement space, that is, the first elastic sleeve does not bear a force at an initial stage of generating radial relative displacement between the convex column and the concave portion, so that a case in which members are damaged due to an excessively large reverse driving force can be effectively avoided.

For example, a stepped hole may be disposed on the connection portion 413. A large-size hole segment of the stepped hole forms the concave portion 414 that fits the convex column 22, and a threaded fastener is used to pass through a small-size hole segment of the stepped hole and is connected to the convex column 22, a step surface between the large-size hole segment and the small-size hole segment presses against the first elastic sleeve 42, and the convex column extends through the first elastic sleeve 42 and the small-size hole segment of the stepped hole in sequence, thereby forming a connector and constructing the limiting pair between the connection portion 413 and the camera carrier 2 in the third direction Z.

Further, as shown in FIG. 8, the connection portion 413 is bent and extends from the body of the transmission push rod 41 towards a groove bottom of the transmission groove 21. In this way, a screw cap part of the threaded fastener does not exceed the transmission push rod 41 in the third direction Z, which is conducive to a miniaturization and thinning design of the device.

To avoid the camera from being affected by a shock or a vibration generated when a position is switched, in an embodiment, a buffer adaptation pair (7, 23) is further provided between the camera carrier 2 and the housing 11 of the electronic device 1. The configuration is as follows: when the camera carrier 2 generates displacement and is switched to a critical position of the protruding working position, the buffer adaptation pair generates buffer damping. "Critical position" herein means an end motion distance interval of a protruding action motion distance of which the camera is about to reach the protruding working position, and the buffer adaptation pair does not need to be configured in the entire protruding process of the camera, that is, the buffer damping is generated only in a motion distance interval of which the camera is about to reach the protruding working position.

Figure 3:
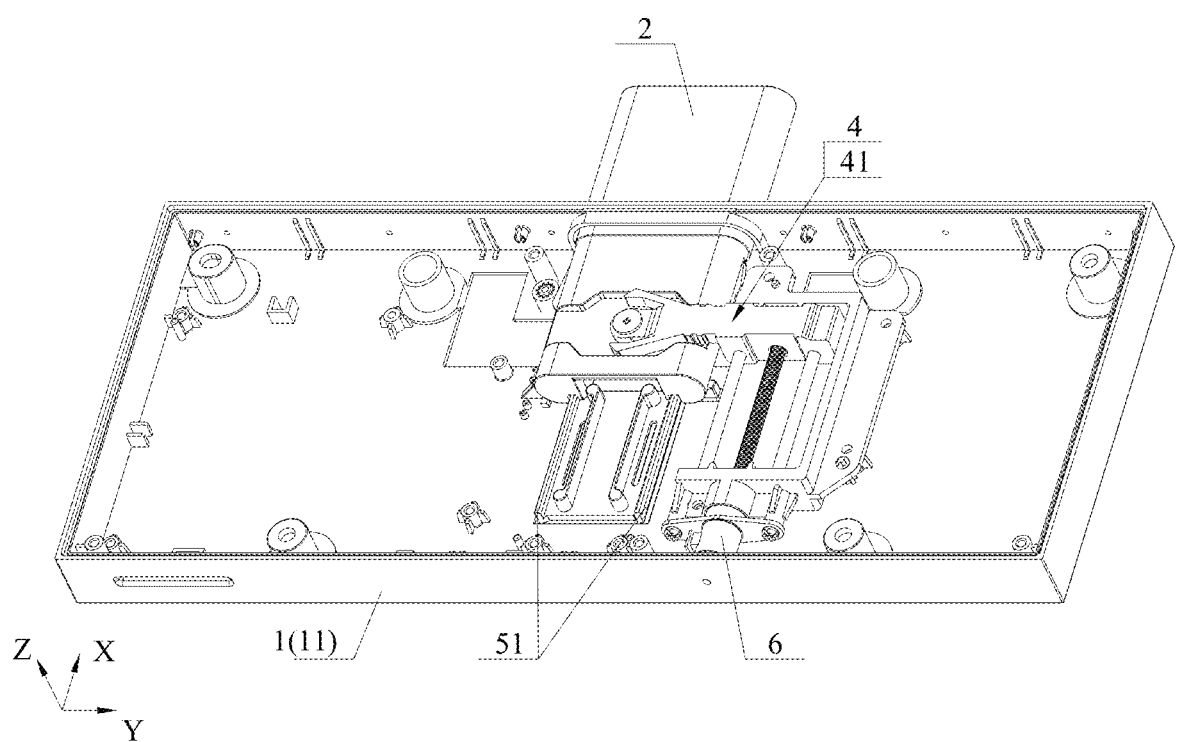
FIG. 3 is a schematic diagram of an overall structure of a camera of an electronic device located in a protruding working position according to Embodiment 1 of the present disclosure.

In this way, when the camera carrier 2 is driven along the first direction X to approach the protruding working position shown in FIG. 3, the buffer damping takes effect at the critical position in advance, and an instantaneous rising speed of the camera carrier 2 is slowed down, so that an instantaneous shock generated when the camera carrier reaches the position can be avoided, and no jitter occurs when the camera reaches the protruding working position.

In addition, based on the buffer adaptation pair, the camera carrier 2 is always affected by the buffer damping in a protruding working state, which is equivalent to constructing a flexible connection relationship between the camera carrier 2 and the housing 11. In this way, when the buffer adaptation pair is used in a bass interaction scenario in which resonance generates, a video image jitter can be avoided through an energy absorption and shock mitigation function provided by the buffer damping.

Figure 12:
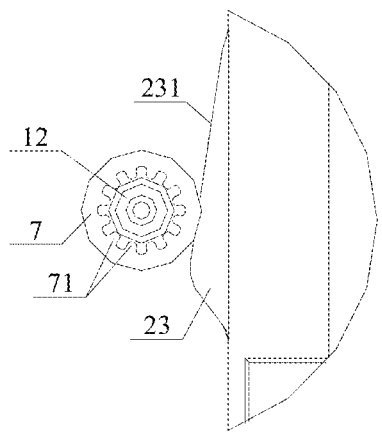
FIG. 12 is an enlarged schematic diagram of a part C in FIG. 4.

As shown in FIG. 4, in an embodiment, the housing 11 is provided with a first mounting column 12 formed by extending along the third direction Z, and a second elastic sleeve 7 is sleeved on the first mounting column 12. Correspondingly, the camera carrier 2 is provided with an adaptation body 23 formed by extending to a side. With reference to FIG. 4 and FIG. 12, the adaptation body 23 is provided with a slope 231 that presses against and fits the second elastic sleeve 7, to construct the buffer adaptation pair, and is configured as follows: in a process in which the camera carrier 2 is switched from the critical position to the protruding working position, press deformation of the second elastic sleeve 7 gradually increases. In this way, in a process in which the camera module 2 gradually reaches the protruding working position, the buffer damping is gradually improved. This provides better user experience.

Further, refer to FIG. 12 as well. A plurality of elastic teeth 71 evenly distributed in a circumferential direction are disposed on an inner wall of the second elastic sleeve 7, and there are tooth gaps between adjacent elastic teeth 71 that are preferably distributed evenly. In this way, tooth gaps of the inner side of the second elastic sleeve 7 provide redundant deformation space. When the slope 231 of the adaptation body 23 on the side of the camera carrier 2 presses against the second elastic sleeve 7, buffering damping can be improved.

Based on an actual situation of internal assembling space, two groups of second elastic sleeves 7 and adaptation bodies 23 may be correspondingly provided and be symmetrically disposed on two sides of the camera carrier 2. This can avoid unbalanced load on the camera carrier 2 in a buffering and positioning process.

With reference to FIG. 3, FIG. 4, FIG. 7, and FIG. 8, sliding rails 51 are disposed on the housing 11 of the electronic device, and correspondingly, sliding slots 52 that fit the sliding rails 51 are disposed on the camera carrier 2. In an embodiment, the foregoing structures are configured on adjacent sides of the camera carrier 2 and the housing 11 in the first direction X, to reduce space occupied in the second direction Y.

Figure 11:
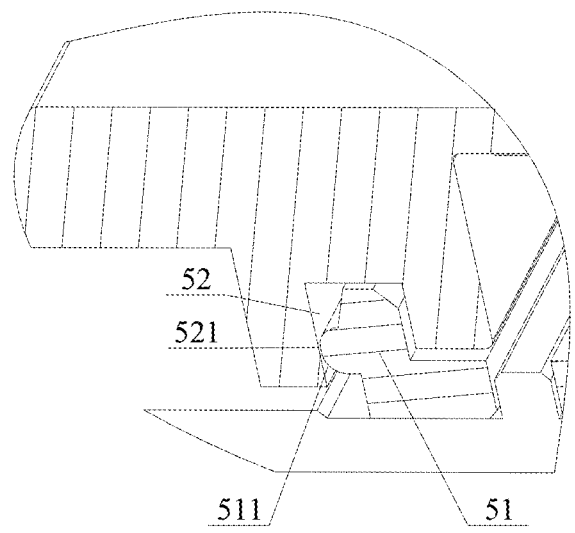
FIG. 11 is an enlarged view of an adaptation relationship between sliding rails and sliding slots shown in FIG. 10.

In addition, for the sliding adaptation pair 5 between the camera carrier 2 and the housing 11, an embodiment provides an anti-unbalanced load design. With reference to FIG. 8 and FIG. 10, the sliding adaptation pair includes two groups of sliding rails 51 and sliding slots 52 that fit each other in a slidable manner along the first direction X, and the two groups are arranged in parallel, to perform synchronous adaptation in a process of working position switching, thereby ensuring that displacement precision of the camera carrier 2 along the first direction X can be kept, and avoiding a phenomenon of getting stuck. In an embodiment, as shown in FIG. 11, each sliding rail 51 constructs a line contact sliding adaptation pair by using a convex arc surface 511 and a corresponding slot wall 521 of the sliding slots 52, to reduce sliding friction resistance.

In addition, the sliding rails in an embodiment may be preferably made of a POM (Polyoxymethylene) material, or a PTFE (Poly tetra fluoroethylene, polytetrafluoroethylene) material, and have a good self-lubricating capability for adaptation in a slidable manner.

As shown in FIG. 8, the two sliding rails 51 are integrated on a mounting plate 53 and are integrally formed. This facilitates quick assembling between the sliding rails 51 and the housing 11. On the basis of obtaining good displacement precision, a process is relatively good.

The actuation component 6 that provides a displacement driving force may be a motor, and converts, by using a screw rod and nut transmission pair of the transmission mechanism 4, the rotation torque output by the motor into a driving force for driving the transmission push rod 41 to generate linear displacement. With reference to FIG. 8, a screw nut 43 is disposed at a first end of the transmission push rod 41, two ends of a screw rod 44 that fits the screw nut 43 are pivotally connected to a fixed support 45, and an output shaft of the motor is in transmission connection with the screw rod 44. The structure is simple and reliable, and control precision of work position switching can be obtained.

In an application, to effectively reduce driving unbalanced load of the first end of the transmission push rod 41, guiding columns 46 may be disposed on two sides of the screw rod 44 in parallel. Correspondingly, the transmission push rod 41 fits two guide columns 46 in a slidable manner, to ensure displacement precision of the transmission push rod 41 along the first direction X.

Most electronic devices configured with cameras need to meet relatively high human-computer interaction experience. For example, but not limited to application scenarios such as gaming, learning, and AI fitness, there is a relatively high requirement for a large field of view in a corresponding application scenario.

Figure 13:
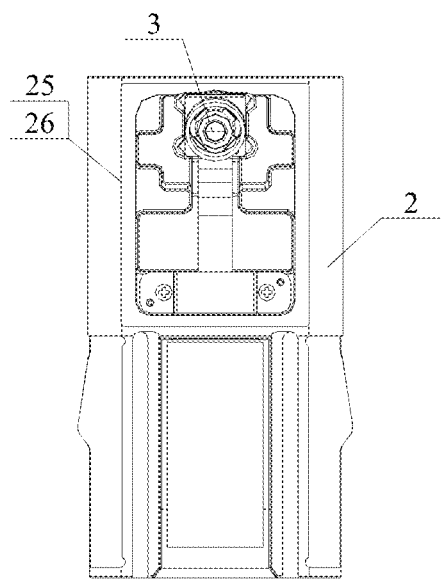
FIG. 13 is a front view of an assembly relationship of the camera module according to Embodiment 1 of the present disclosure.
Figure 14:
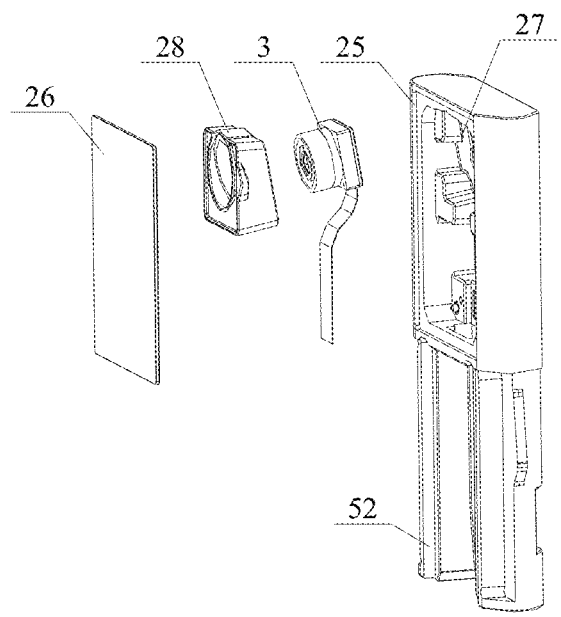
FIG. 14 is an exploded view of assembly of the camera module shown in FIG. 13.
Figure 15:
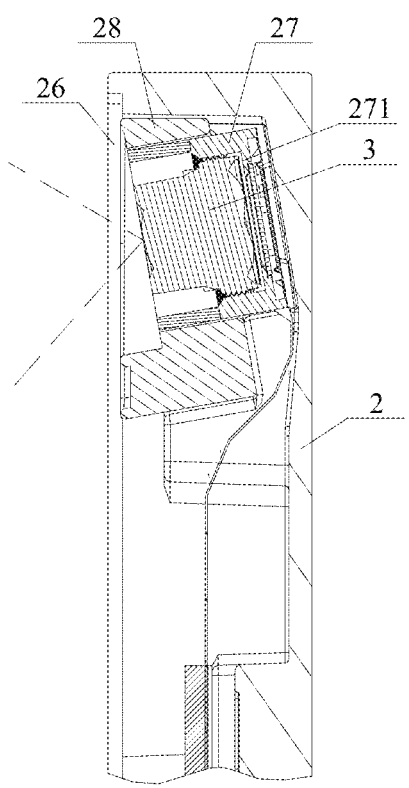
FIG. 15 is a D-D sectional view in FIG. 13.

In an embodiment, the camera module 3 is embedded and fastened in the camera carrier 2, and a field of view of the camera module 3 is tilted forward. Refer to FIG. 13 and FIG. 14. A glass cover 26 is sealed and fixed in a through opening 25 of the camera carrier 2, and an inner side of the through opening 25 is provided with a mounting concave portion 27. Are shown in FIG. 15, a part of the camera module 3 is clamped into the mounting concave portion 27, there is an included angle between a bottom surface 271 of the mounting concave portion 27 and a plane on which the first direction X and the second direction Y are located, and the mounting concave portion 27 is disposed in an inclined manner, so that the camera module 3 is tilted forward to a preset position. A part of an outer periphery of the camera module 3 between the mounting concave portion 27 and the glass cover 26 is sleeved with a profiled moldable sealing silicone 28. In this way, the camera module 3 is limited and constrained jointly by the mounting concave portion 27 and the profiled moldable sealing silicone 28, thereby constructing reliable positioning of the camera module 3. In addition, with reference to FIG. 15, a first ring seal is formed between a first end of the profiled moldable sealing silicone 28 and the glass cover 26, and a second ring seal is formed between a second end of the profiled moldable sealing silicone 28 and the mounting concave portion 27. Herein, the first end and the second end are two end sides that are disposed opposite to each other on the profiled moldable sealing silicone 28. In this way, sealing of the camera module 3 is constructed.

During actual assembling, the camera module 3 is attached to the mounting concave portion 27 by using adhesive backing. The profiled moldable sealing silicone 28 is clamped into the camera module 3 and presses against the mounting concave portion 27 to establish the second ring seal. The glass cover 26 is attached to the through opening 25 of the camera carrier 2 by using adhesive backing and presses against the profiled moldable sealing silicone 28 to establish the first ring seal.

Figure 16:
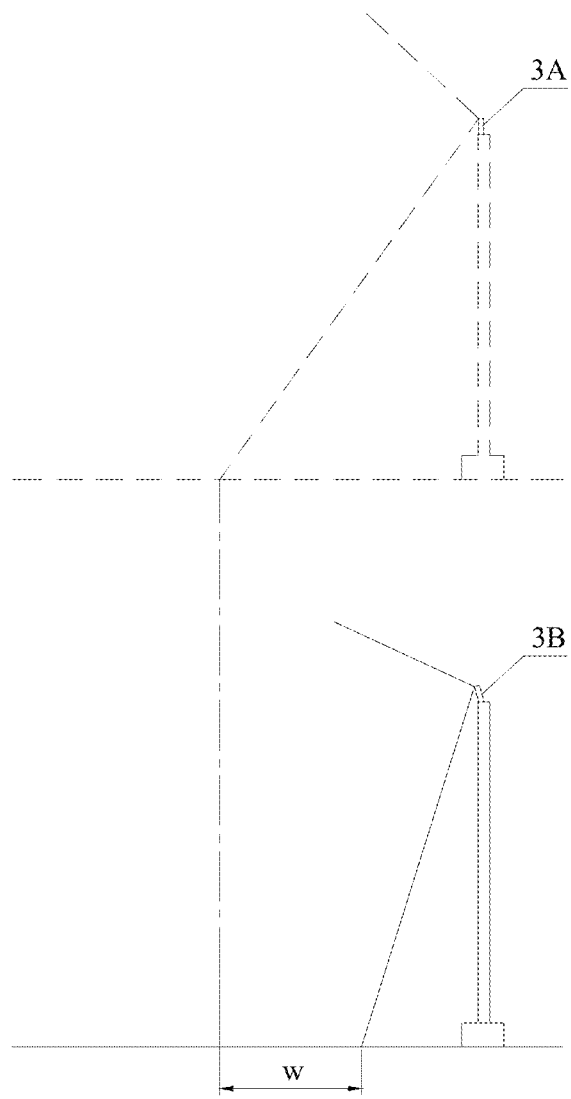
FIG. 16 is a schematic diagram of a field of view utilization principle of the camera module according to Embodiment 1 of the present disclosure.

With reference to FIG. 16, compared with a conventional solution in which a head-up camera 3A is configured, in an embodiment, a part of a field of view of a visible ceiling in a conventional configuration manner is used, thereby reducing a waste of an upper half area of the field of view and implementing forward cover of the field of view by using a camera 3B with a forward field of view. Compared with the head-up camera 3A, in FIG. 16, a size mark W is used to show a forward coverage distance of the field of view of the forward camera 3B. A user can implement a large field of view of the camera without manual adjustment during use. In this way, a large field of view of the camera can be obtained without increasing camera configuration costs, and application interaction and interaction that cover a whole body at a short distance can be met.

Embodiment 2

Figure 17:
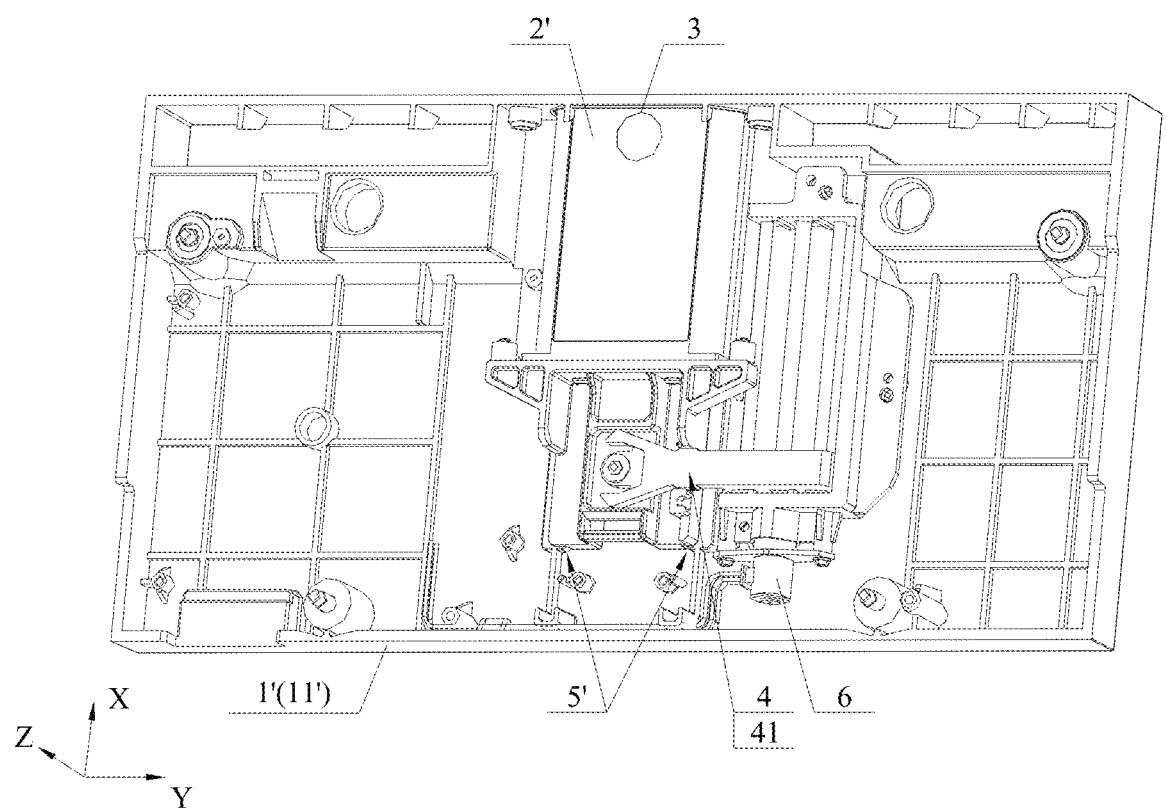
FIG. 17 is a schematic diagram of an overall structure of a camera of an electronic device located in a retracted working position according to Embodiment 2 of the present disclosure.
Figure 18:
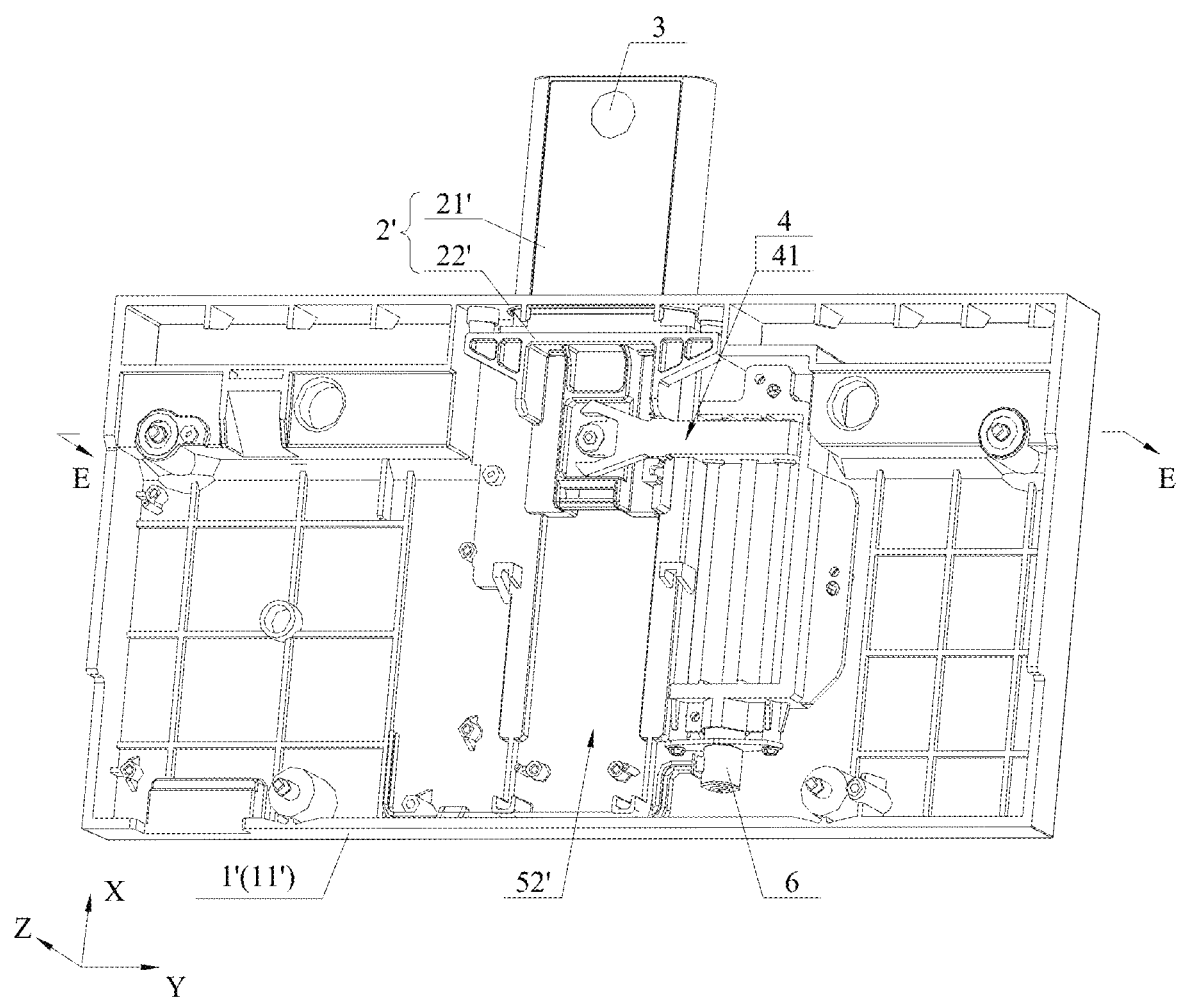
FIG. 18 is a schematic diagram of an overall structure of a camera of an electronic device located in a protruding working position according to Embodiment 2 of the present disclosure.

Refer to FIG. 17 and FIG. 18. To clearly show differences and a relationship between an embodiment and Embodiment 1, a same function composition and structure in the figures are illustrated by using a same numeral.

In an embodiment, a camera module 3 is disposed on a camera carrier 2', and a sliding adaptation pair 5' is disposed between the camera carrier 2' and a housing 11, to drive the camera module 3 up and down. The same as that in Embodiment 1, a transmission mechanism 4 is configured to transmit, to the camera carrier 2', power output by an actuation component 6, and is in transmission connection with the camera carrier 2' by using a transmission push rod 41' as a terminal member on a power transmission path.

Figure 19:
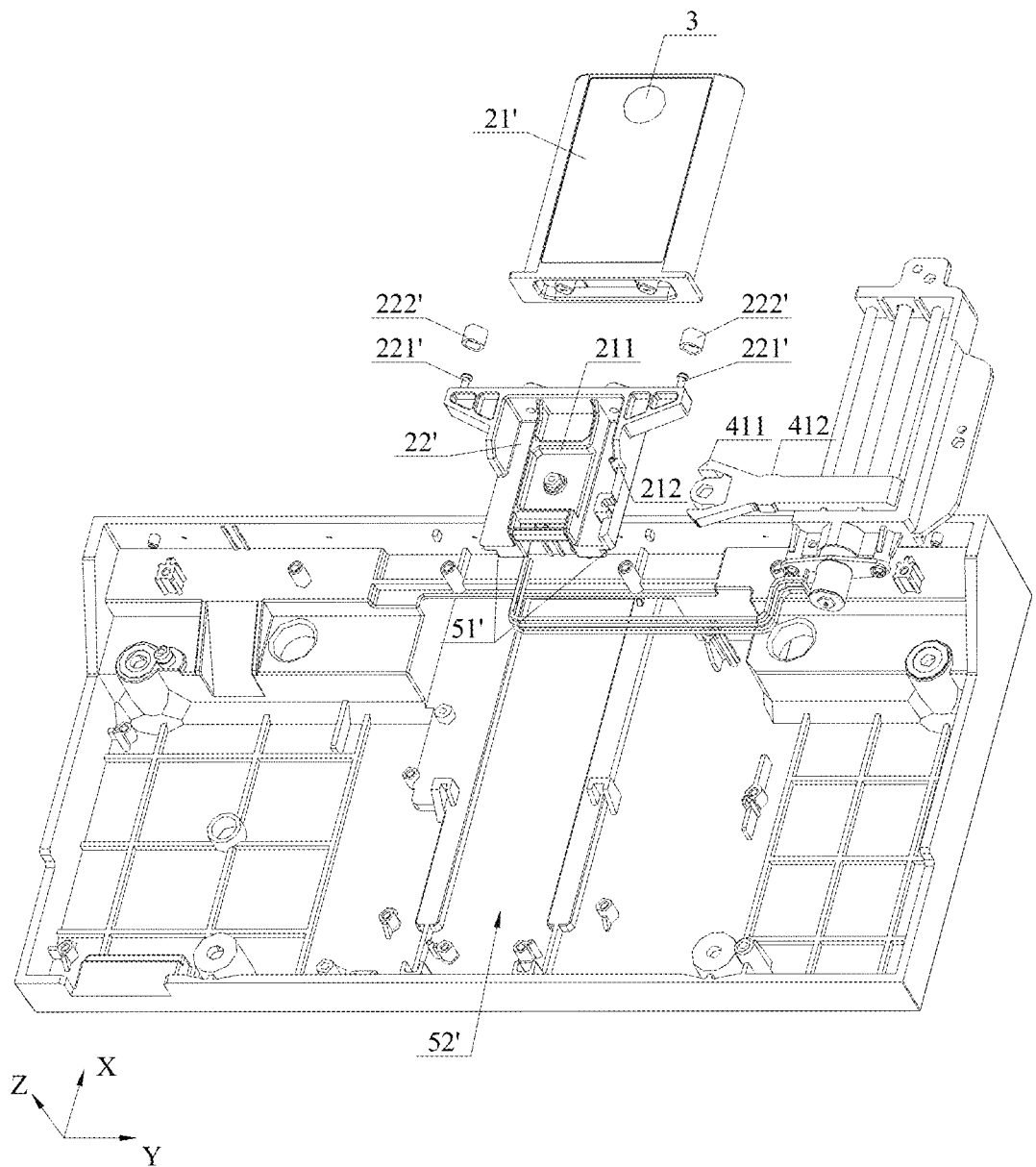
FIG. 19 is an exploded view of assembly of an electronic device according to Embodiment 2 of the present disclosure.

Refer to FIG. 19 as well. A body of the transmission push rod 41 is disposed along a second direction Y, a first end of the transmission push rod 41 is capable of being in transmission connection with a power output end of the actuation component 6, and a second end of the transmission push rod 41 is provided with an elastic arm 411 formed by extending from the body. Correspondingly, a transmission surface 211 is disposed on the camera carrier 2', and the transmission surface 211 may abut against the transmission end of the elastic arm 411 in the first direction X, and is configured as follows: when the transmission push rod 41 generates a tilting trend relative to the camera carrier 2', the elastic arm 411 that presses against the transmission surface 211 by using the transmission end is capable of changing a working attitude relative to the body of the transmission push rod 41. In a process of changing a working attitude, the transmission end of the transmission push rod 41 keeps in line contact with the transmission surface 211. Similarly, the camera assembly has a self-adaptive capability to avoid a phenomenon of getting stuck.

In addition, a reverse driving transmission surface 212 is disposed on the camera carrier 2'. Correspondingly, a reverse driving adaptation portion 412 that is disposed opposite to the reverse driving transmission surface 212 in the first direction X is disposed on the transmission push rod 41, and the reverse driving adaptation portion 412 is disposed in a middle section of the body of the transmission push rod 41, and is configured as follows: in a normal state, there is a predetermined distance T between the reverse driving transmission surface 212 and the reverse driving adaptation portion 412, to consider reverse driving action performance.

It should be noted that, compared with Embodiment 1, in this solution, the transmission mechanism 4 and the actuation component 6 that have a same function principle are used to implement raising/lowering driving and reverse driving of a camera. In addition, the field of view of the camera module 3 is tilted forward, so that a large field of view of the camera can be obtained without increasing camera configuration costs. Details are not described herein again.

In an embodiment, the sliding adaptation pair 5' uses a reverse configuration manner different from that in Embodiment 1. As shown in the figure, sliding rails 51' are disposed on the housing 11 of an electronic device 1', and correspondingly, sliding slots 52' are disposed on the camera carrier 2'. Herein, the sliding adaptation pair 5' includes two groups of sliding rails 51' and sliding slots 52' that fit each other in a slidable manner along the first direction X, and the two groups are arranged in parallel, to perform synchronous adaptation in a process of working position switching, thereby avoiding unbalanced load.

Further, the camera carrier 2' may have a split structure based on requirements for product functions. As shown in FIG. 19, a camera fixing base 21' is fixedly connected to a sliding rail matrix 22' on which the sliding rails 51' are disposed. In this way, the two split parts may be made of different materials.

For example, but not limited to, the camera fixing base 21' is made of a metal material, and the sliding rail matrix 22' may be made of a POM (Polyoxymethylene) material, or a PTFE (Poly tetra fluoroethylene, polytetrafluoroethylene) material and action performance of the sliding adaptation pair is improved by using a self-lubricating capability of the sliding rail matrix 22'.

Figure 20:
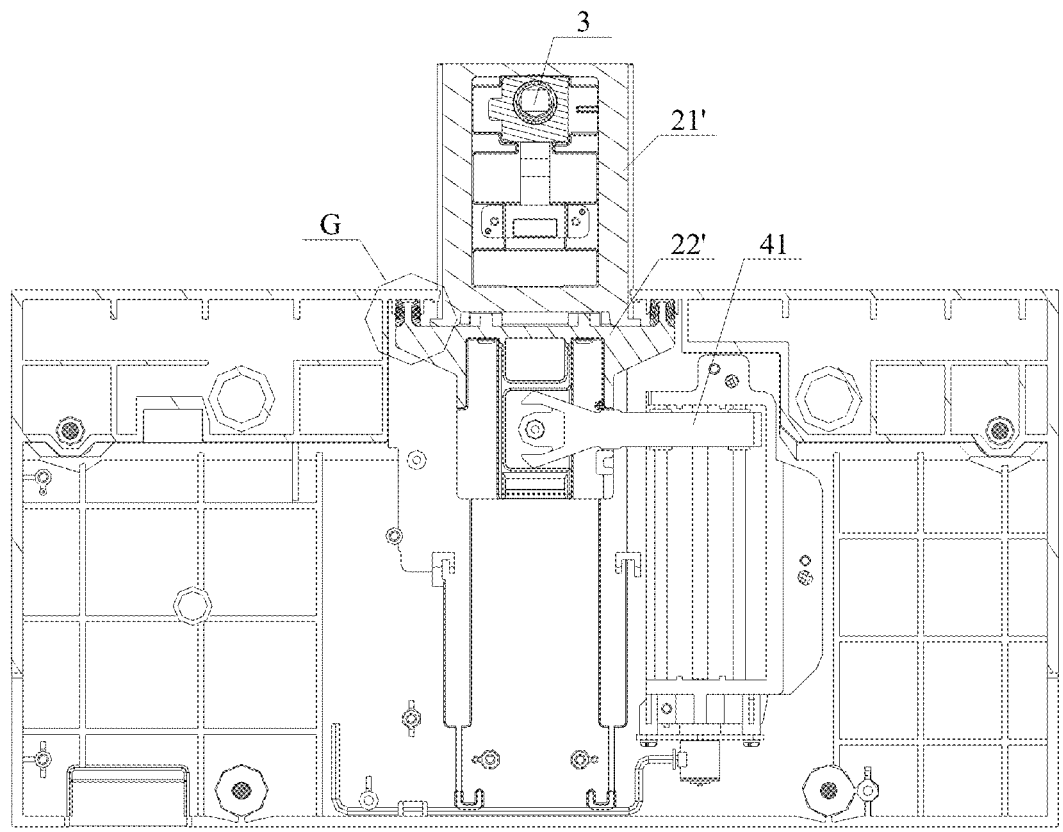
FIG. 20 is a sectional view formed at an E-E sectioned position in FIG. 18.
Figure 21:
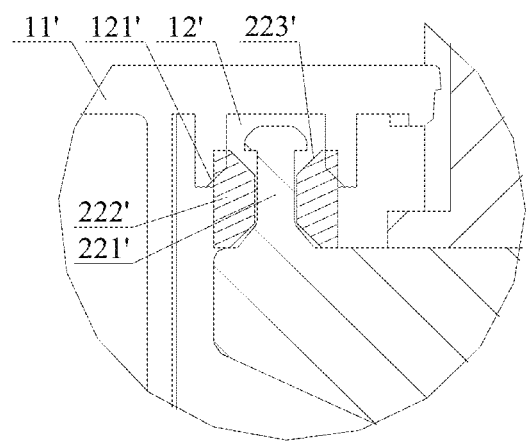
FIG. 21 is a schematic enlarged view of a part G in FIG. 20.

In an embodiment, another buffer adaptation pair is provided to prevent the camera from being affected by a shock generated when a position is switched and a vibration in a use process. Refer to FIG. 20 and FIG. 21 together. The sliding rail matrix 22' is provided with a second mounting column 221' formed by extending along the first direction X, and a third elastic sleeve 222' is sleeved on the second mounting column 221'. Correspondingly, an adaptation hole 12' is disposed on the housing 11', where a hole edge of the adaptation hole 12' is provided with a chamfer 121' that presses against and fits the third elastic sleeve 222', to construct the buffer adaptation pair. In this way, when the camera carrier 2' generates displacement and is switched to a critical position of a protruding working position, the buffer adaptation pair generates buffer damping, and press deformation gradually increases. The buffer damping gradually increases, and no jitter occurs when the camera reaches the position. In addition, based on the buffer adaptation pair, a flexible connection relationship is constructed between the sliding rail matrix 22' and the housing 11', and a video image jitter occurring in a use process can be avoided through a provided energy absorption and shock mitigation function.

To further improve a capability of the buffer adaptation pair, as shown in FIG. 21, a pressing side of the third elastic sleeve 222' is provided with a chamfer 223'. In an embodiment, the chamfer 223' may be disposed on both the hole edge and an outer periphery. Therefore, when the third elastic sleeve 222' presses against and fits the adaptation hole, the chamfer 223' on the pressing side provides redundant deformation space.

For example, two groups of third elastic sleeves 222' and adaptation holes 12' are correspondingly provided and are symmetrically disposed on two sides of the camera carrier 2'. This can avoid unbalanced load in a buffering and positioning process.

It should be noted that, based on an actual situation of internal assembling space of the device, a non-action part of the camera assembly in the foregoing Embodiment 1 and Embodiment 2 may be directly mounted and fixed on the housing 11 of the electronic device or the self-owned housing of the camera assembly, or may be indirectly mounted and fixed on a corresponding housing by using a transition member or structure.

An embodiment of this application further provides an electronic device. The electronic device includes the camera assembly described in FIG. 1 to FIG. 21. The electronic device may be a product such as a smart television, a notebook computer, or a display. It may be determined that other functions of the electronic device are not a core invention point of this application. Therefore, details are not described in this specification.

What is claimed is:

1. An electronic device, comprising:
   a camera assembly comprising:
      a camera carrier having a camera module disposed thereon;
      a sliding adaptation pair disposed between the camera carrier and an electronic device housing to drive, along a first direction, wherein the camera module is configured to generate displacement and be switched between a retracted working position and a protruding working position relative to an electronic device body; and
      a transmission mechanism having a transmission push rod that is in transmission connection with the camera carrier, wherein
         a body of the transmission push rod is disposed along a second direction, a first end of the transmission push rod is capable of being in transmission connection with a power output end of an actuation component, and a second end of the transmission push rod is provided with a transmission portion formed by extending from the body of the transmission push rod,
         a transmission surface is disposed on the camera carrier, and the transmission surface abuts against a transmission end of the transmission portion in the first direction, and
         on a plane formed by the first direction and the second direction, the transmission portion is capable of changing a working attitude relative to the body of the transmission push rod, and the transmission end keeps in line contact with the transmission surface.

2. The electronic device of claim 1, wherein the transmission portion comprises an elastic arm formed by extending from the body of the transmission push rod, wherein a movable end of the elastic arm forms the transmission end, and the elastic arm is configured to be capable of being deformed on the plane relative to the body of the transmission push rod under pressing of the transmission surface, to change a working attitude.

3. The electronic device of claim 2, wherein the camera assembly further comprises a reverse driving transmission surface disposed on the camera carrier, wherein a reverse driving adaptation portion is disposed in a middle section of the body of the transmission push rod and opposite to the reverse driving transmission surface in the first direction, and is configured as follows: in a normal state, there is a predetermined distance between the reverse driving transmission surface and the reverse driving adaptation portion, and under an action of a reverse driving force, after the elastic arm is pressed by the transmission surface and is deformed, the reverse driving transmission surface presses against the reverse driving adaptation portion, to push the transmission push rod to generate displacement.

4. The electronic device of claim 3, wherein the second end of the transmission push rod is further provided with a connection portion elastically connected to the camera carrier in the first direction and the second direction, a limiting pair in a third direction is configured between the connection portion and the camera carrier, and wherein the third direction is perpendicular to the first direction and the second direction.

5. The electronic device of claim 4, wherein one of the connection portion and the camera carrier is provided with a convex column, and the other is provided with a concave portion, the convex column is formed by extending along the third direction disposed in the concave portion, and a first elastic sleeve is disposed between the convex column and the concave portion, to construct an elastic connection between the connection portion and the camera carrier in the first direction and the second direction.

6. The electronic device of claim 3, wherein the transmission end of the transmission portion abuts against a middle position of the transmission surface, and the middle position overlaps a symmetric center line of the camera carrier along the first direction.

7. The electronic device of claim 6, wherein the camera assembly further comprises:
   a first transmission portion and a second transmission portion disposed disposed in the first direction and symmetrically relative to the body of the transmission push rod;
   a first transmission surface is formed on one side of the first transmission portion in the first direction, to drive, by using the transmission push rod, the camera module to be switched to the protruding working position; and
   a second transmission surface is formed on the other side of the second transmission portion in the first direction to drive, by using the transmission push rod, the camera module to be switched to the retracted working position.

8. The electronic device of claim 7, wherein the camera assembly further comprises:
   a first reverse driving adaptation portion and a second reverse driving adaptation portion disposed symmetrically relative to the body of the transmission push rod;
   a first reverse driving transmission surface disposed on one side of the first reverse driving adaptation portion in the first direction to push the transmission push rod by using the camera carrier located in the retracted working position; and
   a second reverse driving transmission surface disposed on the other side of the second reverse driving adaptation portion in the first direction to push the transmission push rod by using the camera carrier located in the protruding working position.

9. The electronic device of claim 8, wherein the camera assembly further comprises a transmission groove disposed along the second direction, wherein the first transmission surface and the second transmission surface are respectively formed in middle areas of groove walls on two sides of the transmission groove, and the first reverse driving transmission surface and the second reverse driving transmission surface are respectively formed in side areas of the groove walls on the two sides of the transmission groove close to the actuation component.

10. The electronic device of claim 4, wherein on a projection plane formed along the third direction, the transmission end is configured to be convex arc-shaped.

11. The electronic device of claim 4, wherein the camera assembly further comprises a buffer adaptation pair disposed between the camera carrier and the electronic device housing, wherein the buffer adaptation pair is configured to generate buffer damping when the camera carrier generates displacement and is switched to a critical position of the protruding working position.

12. The electronic device of claim 11, wherein the electronic device housing is provided with a first mounting column formed by extending along the third direction; a second elastic sleeve is sleeved on the first mounting column; and correspondingly, the camera carrier is provided with an adaptation body formed by extending toward a side, wherein the adaptation body is provided with a slope that presses against and fits the second elastic sleeve, to construct the buffer adaptation pair, and deformation of the second elastic sleeve gradually increases.

13. The electronic device of claim 12, wherein the camera assembly further comprises a plurality of elastic teeth evenly distributed in a circumferential direction and disposed on an inner wall of the second elastic sleeve, a tooth gap is formed between adjacent elastic teeth.

14. The electronic device of claim 11, wherein the camera carrier is provided with a second mounting column formed by extending along the first direction, a third elastic sleeve is sleeved on the second mounting column, and correspondingly, an adaptation hole is disposed on the electronic device housing, wherein a hole edge of the adaptation hole is provided with a chamfer that presses against and fits the third elastic sleeve, to construct the buffer adaptation pair.

15. The electronic device of claim 14, wherein a pressing side of the third elastic sleeve is provided with a chamfer.

16. The electronic device of claim 11, wherein the camera module is embedded and fastened in the camera carrier, and a field of view of the camera module is tilted forward.

17. The electronic device of claim 16, wherein the camera assembly further comprises a glass cover sealed and fixed in a through opening of the camera carrier, wherein an inner side of the through opening is provided with a mounting concave portion, a part of the camera module is clamped into the mounting concave portion, there is an included angle between a bottom surface of the mounting concave portion and a plane on which the first direction and the second direction are located, profiled moldable sealing silicone is sleeved on a part of an outer periphery of the camera module between the mounting concave portion and the glass cover, a first ring seal is formed between a first end of the profiled moldable sealing silicone and the glass cover, and a second ring seal is formed between a second end of the profiled moldable sealing silicone and the mounting concave portion.

18. The electronic device of claim 11, wherein the sliding adaptation pair between the camera carrier and the electronic device housing comprises two groups of sliding rails and sliding slots that are parallel to each other and fit each other in a slidable manner along the first direction.

19. The electronic device of claim 18, wherein the sliding rails are disposed on the electronic device housing, and the sliding slots are disposed on the camera carrier; or the sliding rails are disposed on the camera carrier, and the sliding slots are disposed on the electronic device housing.

20. A camera assembly, comprising:
   a camera assembly housing;
   a camera carrier having a camera module disposed on a body of the camera carrier;
   a sliding adaptation pair disposed between the camera carrier and the camera assembly housing to drive along a first direction, and wherein the camera module is configured to generate displacement and be switched between a retracted working position and a protruding working position relative to the camera assembly housing; and
   a transmission mechanism, comprising:
      a transmission push rod in transmission connection with the camera carrier, wherein a body of the transmission push rod is disposed along a second direction, a first end of the transmission push rod is capable of being in transmission connection with a power output end of an actuation component, and a second end of the transmission push rod is provided with a transmission portion formed by extending from the body, and
      a transmission surface formed on the camera carrier, wherein the transmission surface abuts against a transmission end of the transmission portion in the first direction, and on a plane formed by the first direction and the second direction, the transmission portion is capable of changing a working attitude relative to the body of the transmission push rod, and the transmission end keeps in line contact with the transmission surface.

21. The camera assembly of claim 20, wherein the transmission portion comprises an elastic arm formed by extending from the body of the transmission push rod, wherein a movable end of the elastic arm forms the transmission end, and the elastic arm is configured to be capable of being deformed on the plane relative to the body of the transmission push rod under pressing of the transmission surface, to change a working attitude.

* * * * *